(12) United States Patent
Suzuki et al.

(10) Patent No.: US 7,545,965 B2
(45) Date of Patent: Jun. 9, 2009

(54) IMAGE MODIFICATION AND DETECTION USING MASSIVE TRAINING ARTIFICIAL NEURAL NETWORKS (MTANN)

(75) Inventors: Kenji Suzuki, Clarendon Hills, IL (US); Kunio Doi, Willowbrook, IL (US)

(73) Assignee: The University of Chicago, Chicago, IL (US)

( * ) Notice: Subject to any disclaimer, the term of this patent is extended or adjusted under 35 U.S.C. 154(b) by 1189 days.

(21) Appl. No.: 10/703,617

(22) Filed: Nov. 10, 2003

(65) Prior Publication Data

US 2005/0100208 A1  May 12, 2005

(51) Int. Cl.
G06K 9/00 (2006.01)
(52) U.S. Cl. .................. 382/128; 382/155
(58) Field of Classification Search ......... 382/128–132, 382/155–161
See application file for complete search history.

(56) References Cited

U.S. PATENT DOCUMENTS

| | | | | | |
|---|---|---|---|---|---|
| 5,528,704 | A | * | 6/1996 | Parker et al. | 382/299 |
| 5,926,568 | A | * | 7/1999 | Chaney et al. | 382/217 |
| 6,757,442 | B1 | * | 6/2004 | Avinash | 382/274 |
| 6,782,137 | B1 | * | 8/2004 | Avinash | 382/254 |
| 7,263,710 | B1 | * | 8/2007 | Hummel et al. | 725/86 |
| 7,313,260 | B2 | * | 12/2007 | Wang et al. | 382/128 |
| 2004/0024303 | A1 | * | 2/2004 | Banks et al. | 600/407 |
| 2004/0068170 | A1 | * | 4/2004 | Wang et al. | 600/407 |
| 2005/0100208 | A1 | * | 5/2005 | Suzuki et al. | 382/157 |
| 2007/0081712 | A1 | * | 4/2007 | Huang et al. | 382/128 |

OTHER PUBLICATIONS

U.S. Appl. No. 11/181,884, filed Jul. 15, 2005, Suzuki et al.

* cited by examiner

Primary Examiner—Aaron W Carter
(74) Attorney, Agent, or Firm—Oblon, Spivak, McClelland, Maier & Neustadt, P.C.

(57) ABSTRACT

A method, system, and computer program product for modifying an appearance of an anatomical structure in a medical image, e.g., rib suppression in a chest radiograph. The method includes: acquiring, using a first imaging modality, a first medical image that includes the anatomical structure; applying the first medical image to a trained image processing device to obtain a second medical image, corresponding to the first medical image, in which the appearance of the anatomical structure is modified; and outputting the second medical image. Further, the image processing device is trained using plural teacher images obtained from a second imaging modality that is different from the first imaging modality. In one embodiment, the method also includes processing the first medical image to obtain plural processed images, wherein each of the plural processed images has a corresponding image resolution; applying the plural processed images to respective multi-training artificial neural networks (MTANNs) to obtain plural output images, wherein each MTANN is trained to detect the anatomical structure at one of the corresponding image resolutions; and combining the plural output images to obtain a second medical image in which the appearance of the anatomical structure is enhanced.

29 Claims, 31 Drawing Sheets

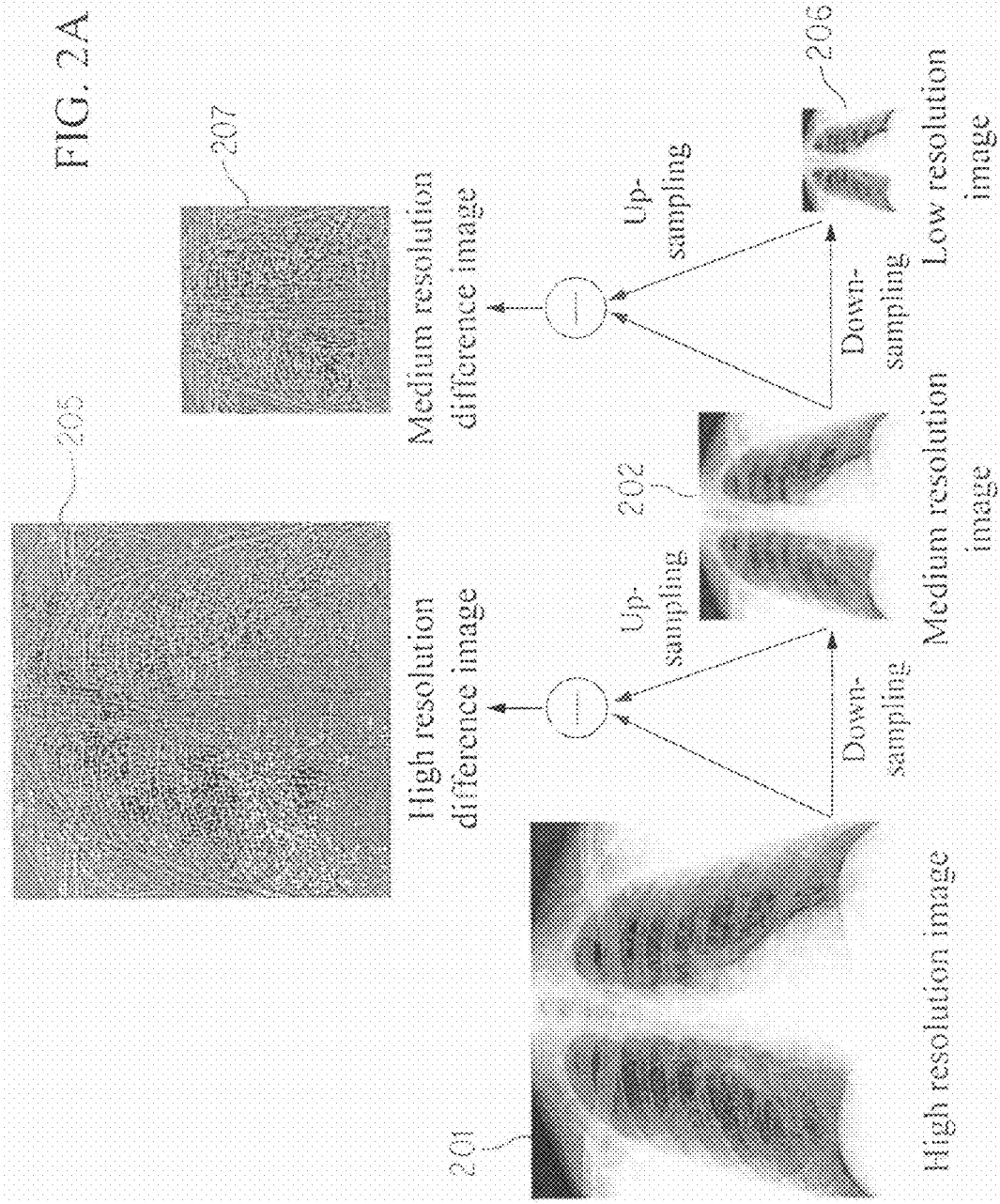

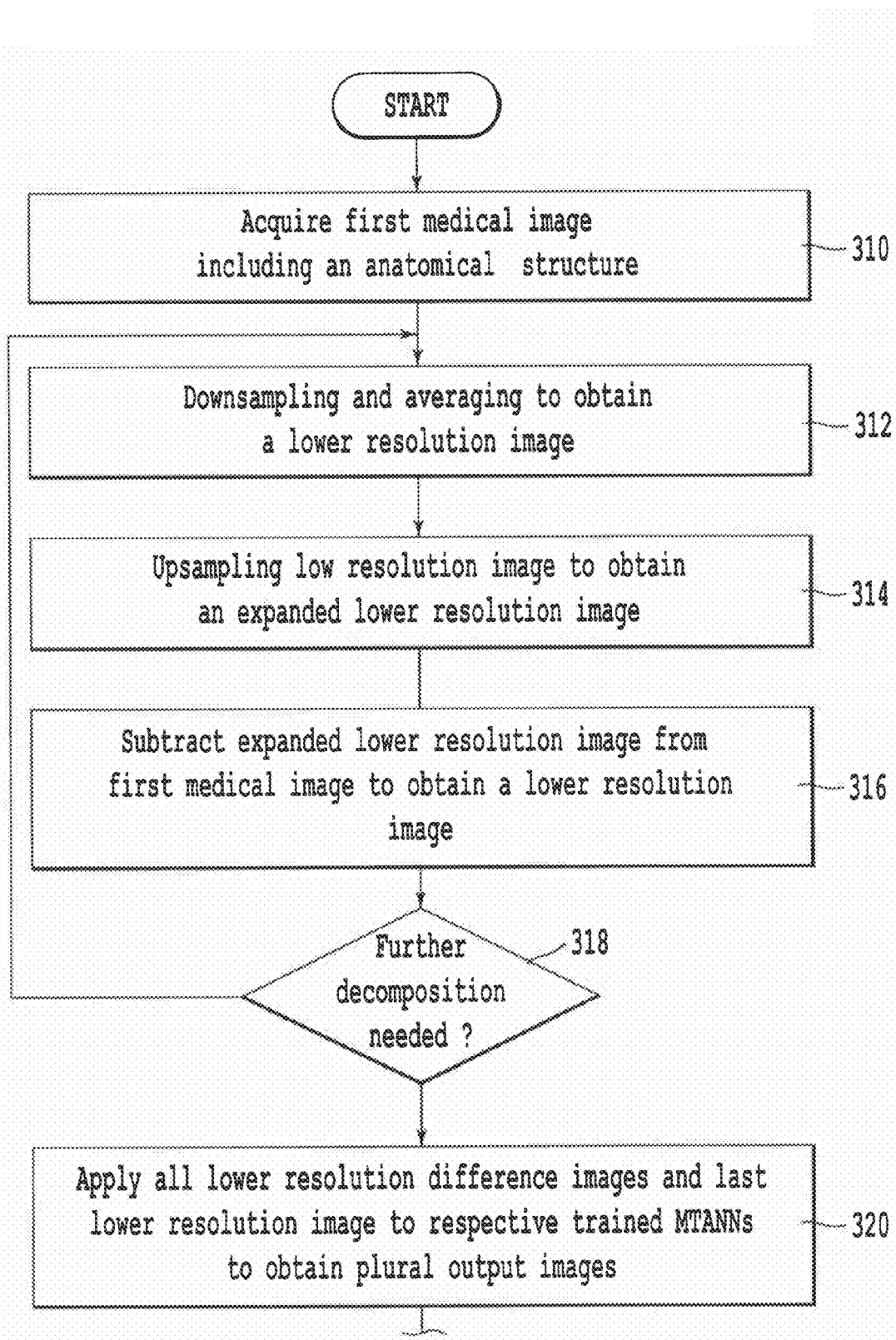
Fig.3C(1)

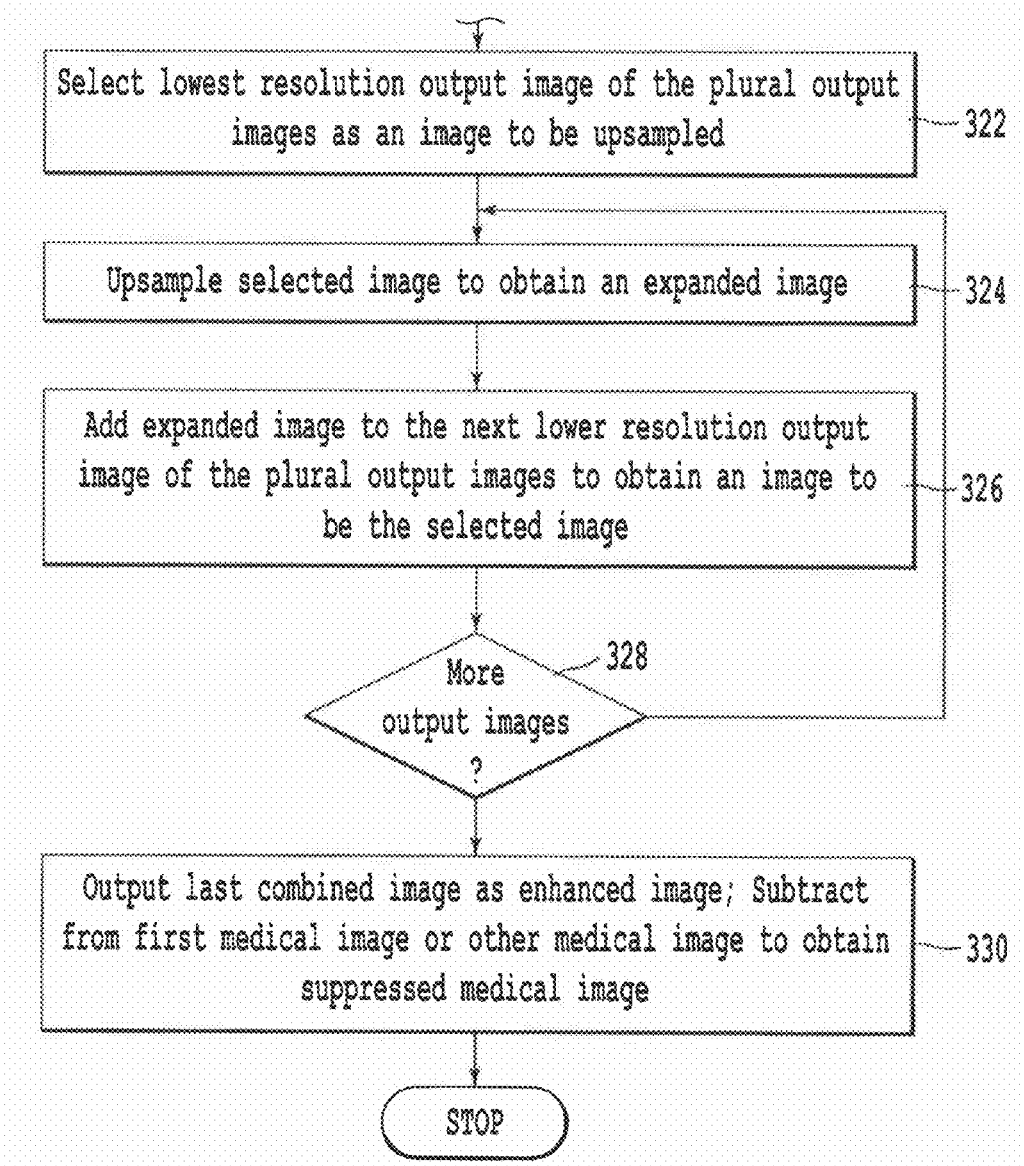
Fig.3C(2)

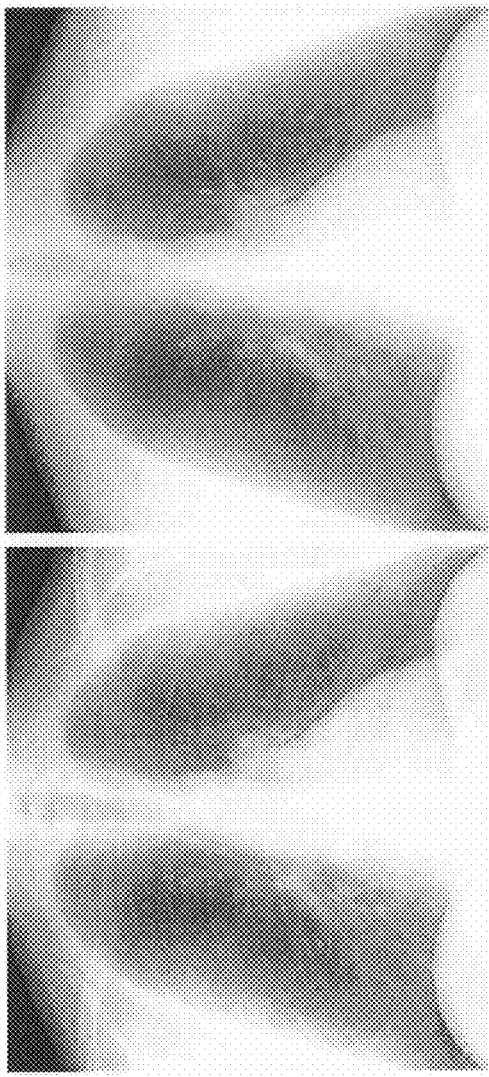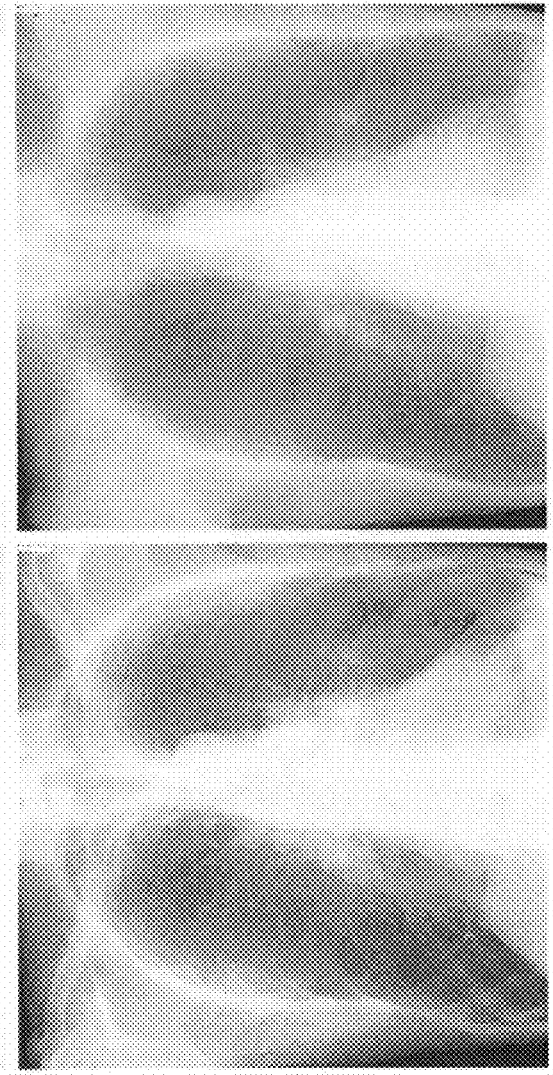
FIG. 7A  FIG. 7B  FIG. 7C  FIG. 7D

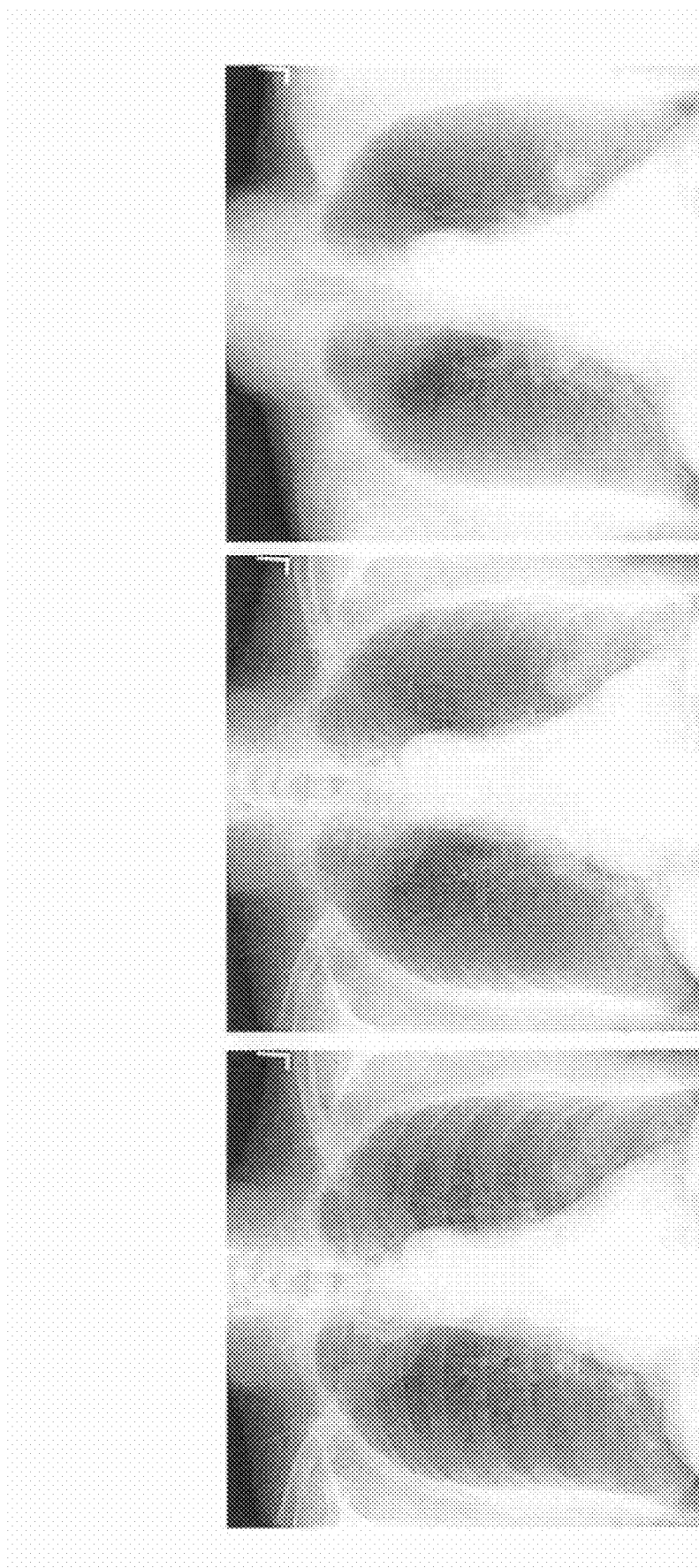

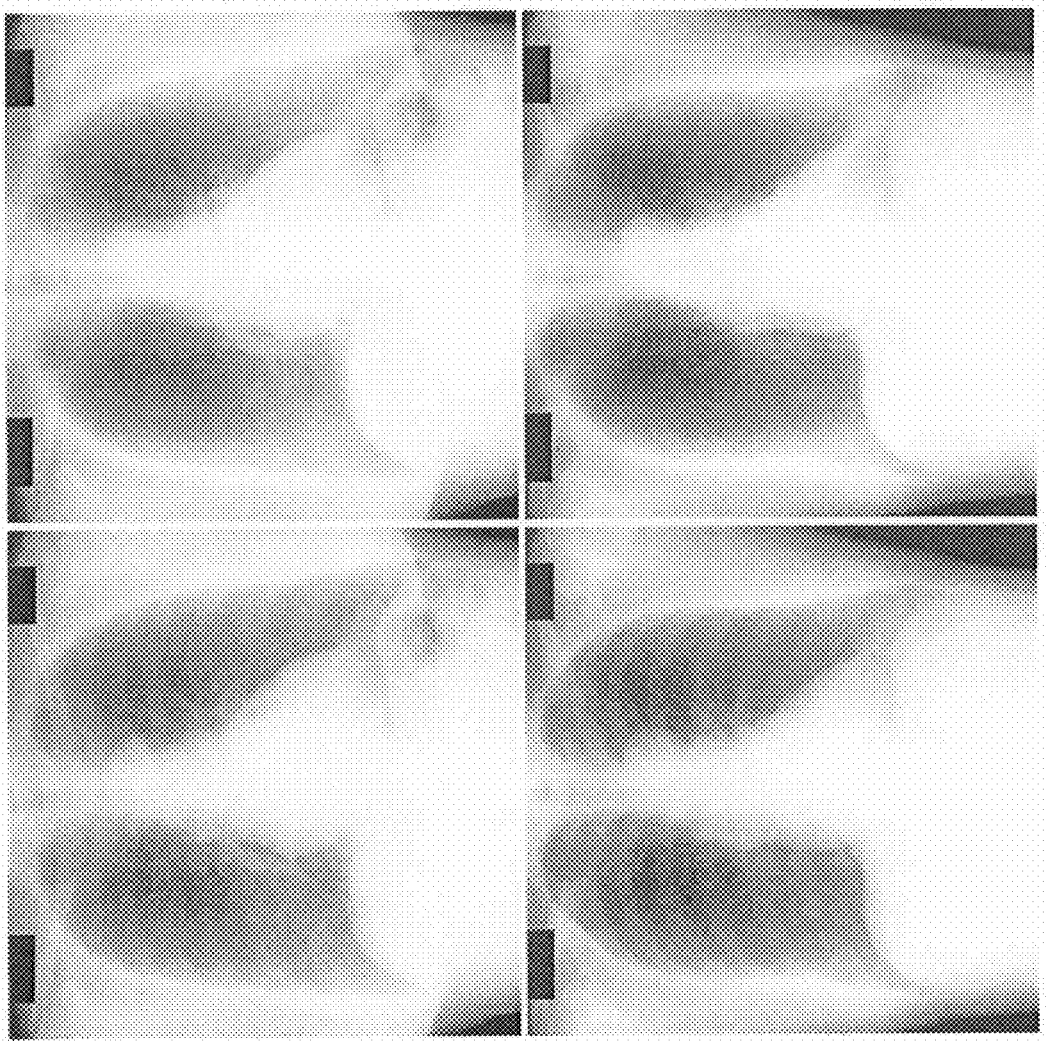

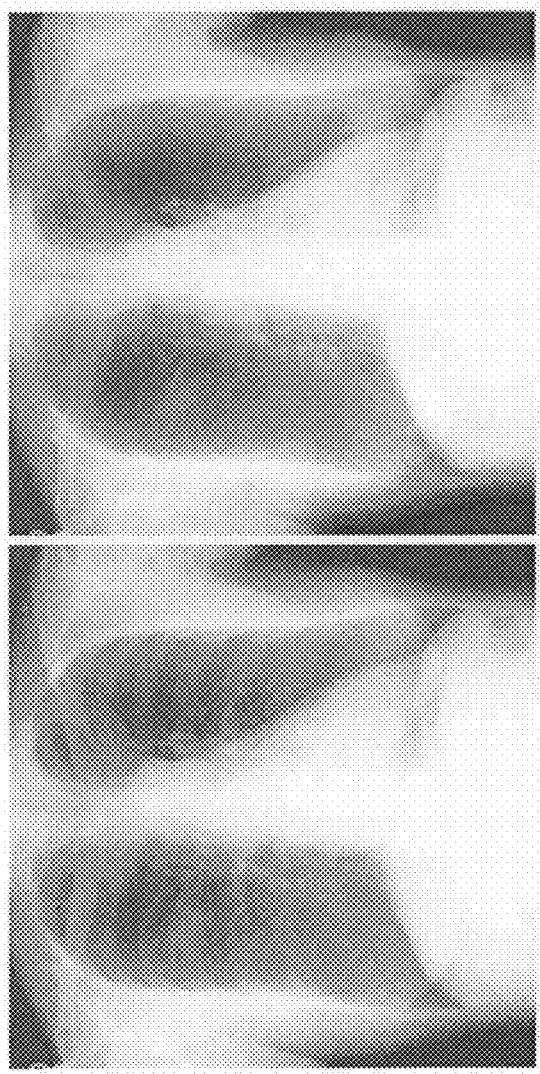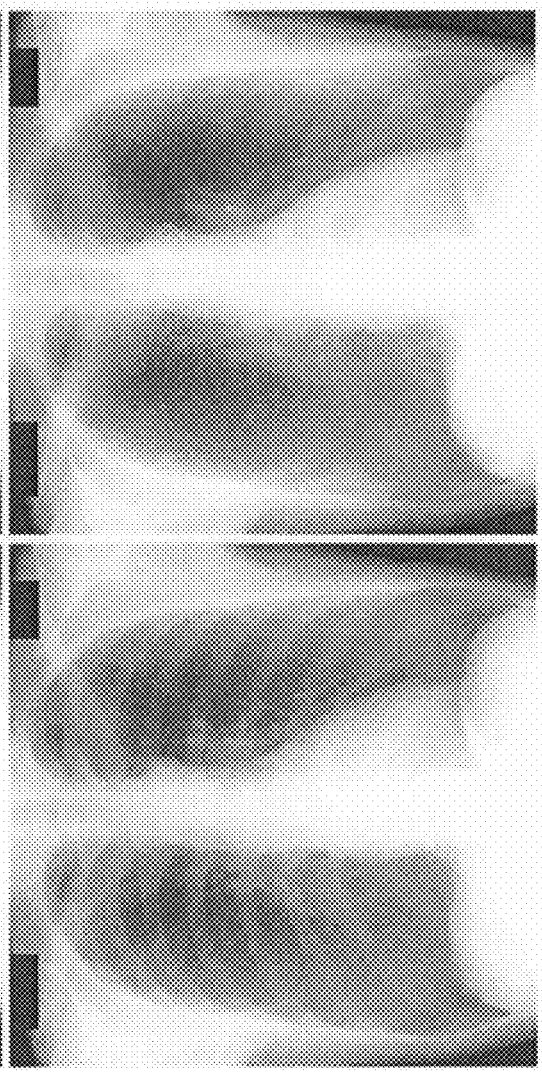
FIG. 9K  FIG. 9L
FIG. 9E  FIG. 9F

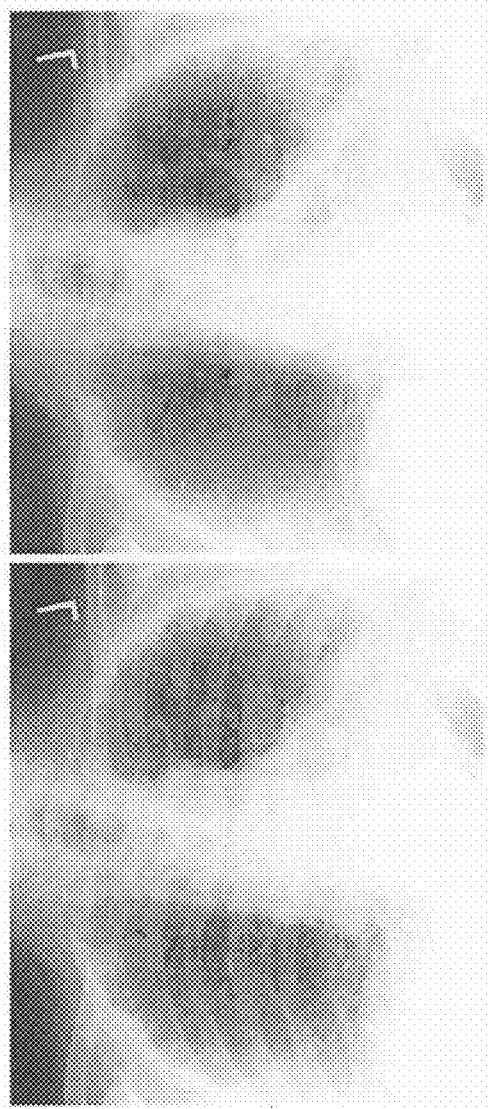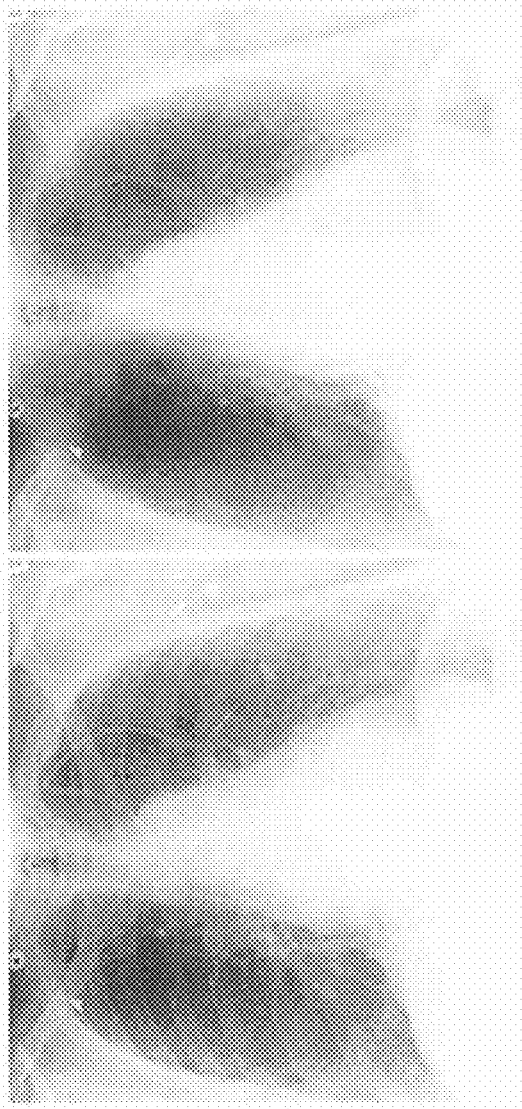
FIG. 10A  FIG. 10B  FIG. 10C  FIG. 10D

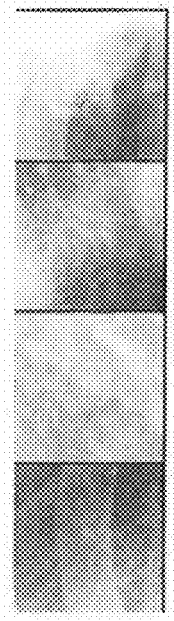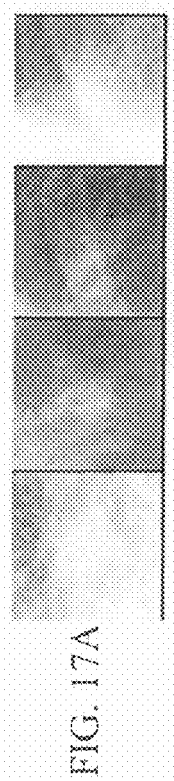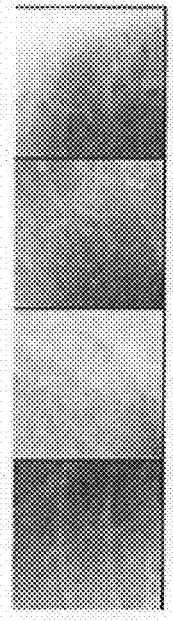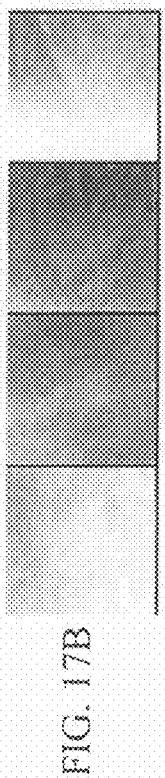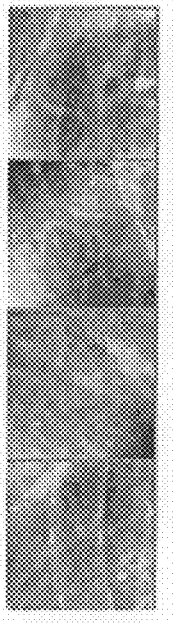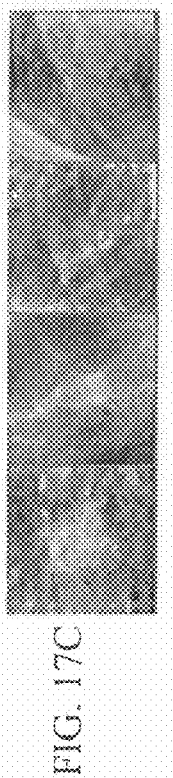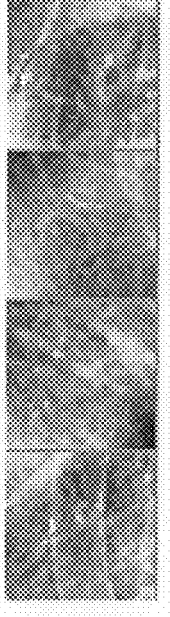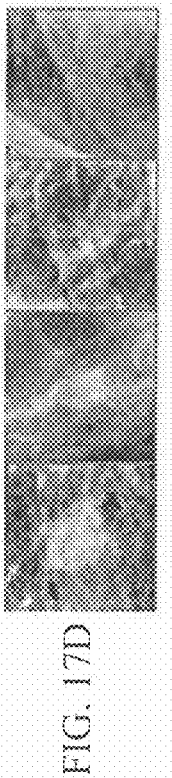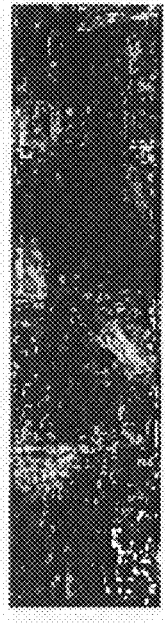
FIG. 17A, FIG. 17B, FIG. 17C, FIG. 17D, FIG. 17E
FIG. 18A, FIG. 18B, FIG. 18C, FIG. 18D, FIG. 18E

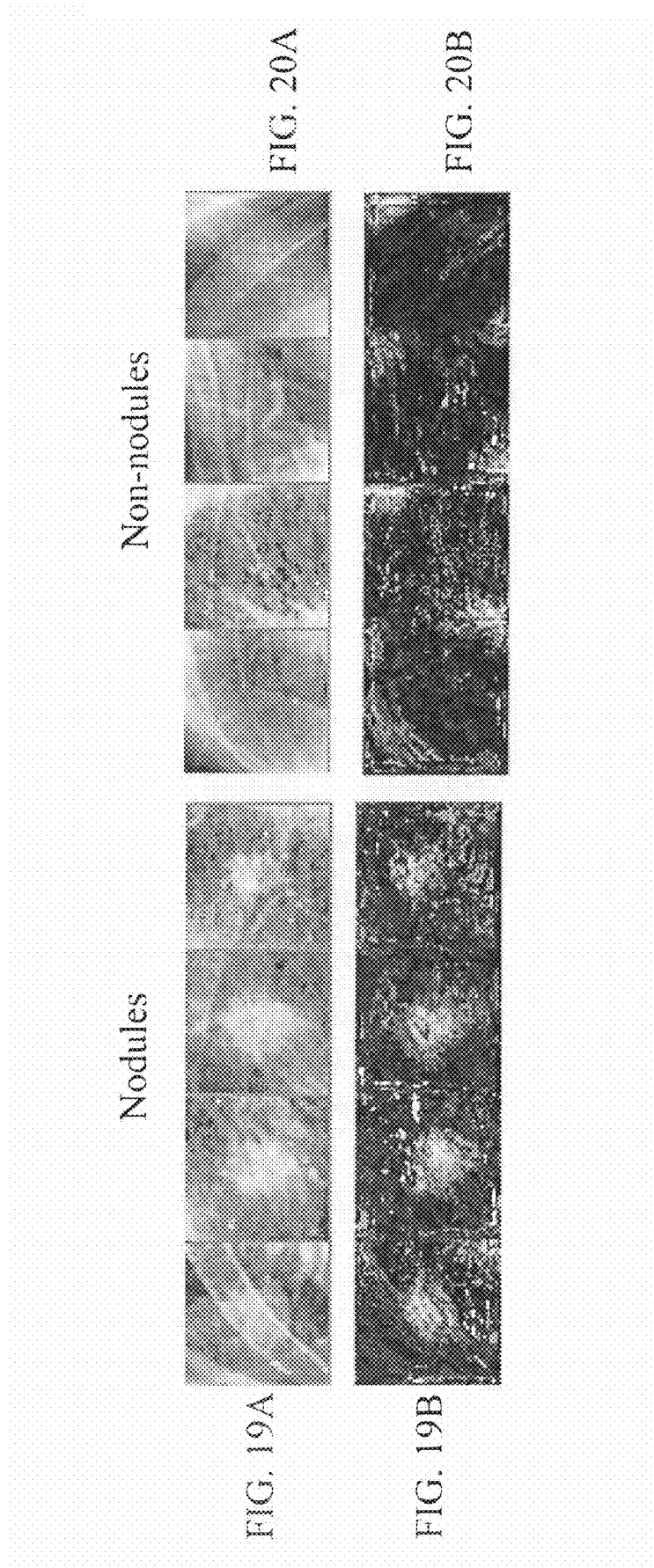

IMAGE MODIFICATION AND DETECTION USING MASSIVE TRAINING ARTIFICIAL NEURAL NETWORKS (MTANN)

STATEMENT REGARDING FEDERALLY SPONSORED RESEARCH

The present invention was made in part with U.S. Government support under USPHS Grant No. CA62625. The U.S. Government may have certain rights to this invention.

BACKGROUND OF THE INVENTION

Field of the Invention

The present invention relates generally to the automated suppression of structures and assessment of abnormalities in images, and more particularly to methods, systems, and computer program products for suppression of bone structures and detection of abnormalities (such as lesions and lung nodules) in medical images (such as low-dose CT scans) using artificial intelligence techniques, including massive training artificial neural networks (MTANNs).

The present invention also generally relates to computerized techniques for automated analysis of digital images, for example, as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,732,697; 5,740,268; 5,790,690; 5,832,103; 5,873,824; 5,881,124; 5,931,780; 5,974,165; 5,982,915; 5,984,870; 5,987,345; 6,011,862; 6,058,322; 6,067,373; 6,075,878; 6,078,680; 6,088,473; 6,112,112; 6,138,045; 6,141,437; 6,185,320; 6,205,348; 6,240,201; 6,282,305; 6,282,307; 6,317,617; 6,466,689; 6,363,163; 6,442,287; 6,335,980; 6,594,378; 6,470,092; 6,483,934; as well as U.S. patent application Ser. Nos. 08/398,307; 09/759,333; 09/760,854; 09/773,636; 09/816,217; 09/830,562; 09/818,831; 09/860,574; 10/270,674; 09/990,311; 09/990,310; 09/990,377; 10/078,694; 10/079,820; 10/120,420; 10/126,523; 10/301,836; 10/360,814; 10/366,482; and, as well as PCT patent applications PCT/US98/15165, all of which are incorporated herein by reference.

The present invention includes the use of various technologies referenced and described in the above-noted U.S. Patents and Applications, as well as described in the documents identified in the following LIST OF REFERENCES, which are cited throughout the specification by the corresponding reference number in brackets:

LIST OF REFERENCES

1. Frost J K, Ball W C Jr, Levin M L, Tockman M S, Baker R R, Carter D, Eggleston J C, Erozan Y S, Gupta P K, Khouri N F. Early lung cancer detection: results of the initial (prevalence) radiologic and cytologic screening in the Johns Hopkins study. AM REV RESPIR DIS 130: 549-554, 1984.

2. Flehinger B J, Melamed M R, Zaman M B, Heelan R T, Perchick W B, Martini N. Early lung cancer detection: results of the initial (prevalence) radiologic and cytologic screening in the Memorial Sloan-Kettering study. AM REV RESPIR DIS 130: 550-560, 1984.

3. Fontana R S, Sanderson D R, Taylor W F, Woolner L B, Miller W E, Muhm J R, Uhlenhopp M A. Early lung cancer detection: results of the initial (prevalence) radiologic and cytologic screening in the Mayo Clinic study. AM REV RESPIR DIS 130: 561-565, 1984.

4. Kubik A, Polak J. Lung cancer detection: results of a randomized prospective study in Czechoslovakia. CANCER 57: 2427-2437, 1986.

5. Henschke C I, Miettinen O S, Yankelevitz D F, Libby D M, Smith J P. Radiographic screening for cancer: proposed paradigm for requisite research. CLINICAL IMAGING 18: 16-20, 1994.

6. Flehinger B J, Kimmel M, Melamed M R. The effect of surgical treatment on survival from early lung cancer: implication for screening. CHEST 101: 1013-1018, 1992.

7. Sobue T, Suzuki R, Matsuda M, Kuroishi T, Ikeda S, Naruke T. Survival for clinical stage I lung cancer not surgically treated. CANCER 69: 685-692, 1992.

8. Miettinen O S. Screening for lung cancer. RADIOL CLINIC NORTH AM 38: 479-496, 2000.

9. Heelan R T, Flehinger B J, Melamed M R, Zaman M B, Perchick W B, Caravelli J F, Martini N. Non-small-cell lung cancer: results of the New York screening program. RADIOLOGY 151: 289-293, 1984.

10. Austin J H M, Romney B M, Goldsmith L S. Missed bronchogenic carcinoma: radiographic findings in 27 patients with a potentially resectable lesion evident in retrospect. RADIOLOGY 182: 115-122, 1992.

11. Shah P K, Austin J H M, White C S, Patel P, Haramati L B, Pearson G D N, Shiau M C, Berkmen Y M. Missed non-small cell lung cancer: radiographic findings of potentially resectable lesions evident only in retrospect. RADIOLOGY 226: 235-241, 2003.

12. Abe K, Doi K, MacMahon H, Giger M L, Jia H, Chen X, Kano A, Yanagisawa T: Computer-aided diagnosis in chest radiography: analysis of results in a large clinical series. INVEST RADIOL 28: 987-993, 1993.

13. Kobayashi T, Xu X W, MacMahon H, Metz C E, Doi K. Effect of a computer-aided diagnosis scheme on radiologists' performance in detection of lung nodules on radiographs. RADIOLOGY 199: 843-848, 1996.

14. Giger M L, Doi K, MacMahon H. Image feature analysis and computer-aided diagnosis in digital radiography. Automated detection of nodules in peripheral lung fields. MED PHYS 15: 158-166, 1988.

15. Giger M L, Doi K, MacMahon H, Metz C E, Yin F F. Pulmonary nodules: computer-aided detection in digital chest images. RADIOGRAPHICS 10: 41-51, 1990.

16. Xu X W, Doi K, Kobayashi T, MacMahon H, Giger M L. Development of an improved CAD scheme for automated detection of lung nodules in digital chest images. MED PHYS 24: 1395-1403, 1997.

17. Li Q, Katsuragawa S, Doi K. Computer-aided diagnostic scheme for pulmonary nodule detection in digital chest radiographs: elimination of false-positives by using a multiple-templates matching technique. MED PHYS 28: 2070-2076, 2001.

18. Shiraishi J, Abe H, Engelmann R, Doi K. Characteristics of image database on the performance of computer-aided diagnosis for the detection of pulmonary nodules in chest radiographs. PROC SPIE MED IMAG 5032: 177-182, 2003.

19. Ballard D, Sklansky J. A ladder-structured decision tree for recognizing tumors in chest radiographs. IEEE TRANS COMPUTER 20: 503-513, 1976.

20. Sklansky J, Petkovic D. Two-resolution detection of lung tumors in chest radiographs. Multiresolution Image Processing and Analysis (Springer-Verlag, Berlin), 365-378, 1984.

21. Lampeter W, Wandtke J. Computerized search of chest radiographs for nodules. INVEST RADIOL 21: 384-390, 1986.

22. Lo S C, Lou S I, Lin J S, Freedman M, Chien M, Mun S. Artificial convolution neural network techniques and applications for lung nodule detection. IEEE TRANS MED IMAG 14: 711-718, 1995.

23. Lin J S, Lo S C, Hasegawa A, Freedman M, Mun S. Reduction of false positives in lung nodule detection using a two-level neural classification. IEEE TRANS MED IMAG 15: 206-217, 1996.

24. Floyd C Jr, Patz E, Lo J, Vittittoe N, Stambaugh L. Diffuse nodular lung disease on chest radiographs: a pilot study of characterization by fractal dimension. AM J ROENTGENOL 167: 1185-1187, 1996.

25. Catarious D Jr, Baydush A, Floyd C Jr. Initial development of a computer-aided diagnosis tool for solitary pulmonary nodules. PROC SPIE MED IMAG 4322: 710-717, 2001.

26. Mao F, Qian W, Gaviria J, Clarke L P. Fragmentary window filtering for multiscale lung nodule detection: preliminary study. ACAD RADIOL 5: 306-311, 1998.

27. Carreira M J, Cabello D, Penedo M G, Mosquera A. Computer-aided diagnosis: automatic detection of lung nodules. MED PHYS 25: 1998-2006, 1998.

28. Penedo M G, Carreira M J, Mosquera A, Cabello D. Computer-aided diagnosis: a neural-network-based approach to lung nodule detection. IEEE TRANS MED IMAG 17: 872-880, 1998.

29. Kelcz F, Zink F E, Peppler W W, Kruger D G, Ergun D L, Mistretta C A Conventional chest radiography vs dual-energy computed radiography in the detection and characterization of pulmonary nodules. AJR 162: 271-278, 1994.

30. Ergun D L, Mistretta C A, Brown D B, Bystrianyk R T, Kwong Sze W, Kelcz F, Naidich D R. Single-exposure dual-energy computed radiography: improved detection and processing. RADIOLOGY. 174: 243-249, 1990.

31. Shiraishi J, Katsuragawa S, Ikezoe J, Matsumoto T, Kobayashi T, Komatsu K, Matsui M, Fujita H, Kodera Y, Doi K. Development of a digital image database for chest radiographs with and without a lung nodule: ROC analysis on radiologists' performance in detection of pulmonary nodules. AJR 174: 71-74, 2000.

32. Suzuki K, Horiba I, Sugie N, Nanki M. Noise reduction of medical X-ray image sequences using a neural filter with spatiotemporal inputs. PROC INT SYMP NOISE REDUCTION FOR IMAG AND COMM SYSTEMS 85-90, 1998.

33. Suzuki K, Horiba I, Sugie N. Efficient approximation of a neural filter for quantum noise removal in X-ray images. IEEE TRANS SIGNAL PROCESSING 50: 1787-1799, 2002.

34. Suzuki K, Horiba I, Sugie N, Nanki M. Neural filter with selection of input features and its application to image quality improvement of medical image sequences. IEICE TRANS INFORMATION AND SYSTEMS E85-D: 1710-1718, 2002.

35. Suzuki K, Horiba I, Sugie N. Training under achievement quotient criterion. IEEE NEURAL NETWORKS FOR SIGNAL PROCESSING X 537-546, 2000.

36. Suzuki K, Horiba I, Sugie N. Signal-preserving training for neural networks for signal processing. PROC IEEE INT SYMP INTELLIGENT SIGNAL PROCESSING AND COMM SYSTEMS 1: 292-297, 2000.

37. Suzuki K, Horiba I, Sugie N. Simple unit-pruning with gain-changing training. IEEE NEURAL NETWORKS FOR SIGNAL PROCESSING XI 153-162, 2001

38. Suzuki K, Horiba I, Sugie N. Edge detection from noisy images using a neural edge detector. IEEE NEURAL NETWORKS FOR SIGNAL PROCESSING X: 487-496, 2000

39. Suzuki K, Horiba I, Sugie N. Neural edge detector—a good mimic of conventional one yet robuster against noise. LECTURE NOTES IN COMPUTER SCIENCE 2085: 303-310, 2001.

40. Suzuki K, Horiba I, Sugie N, Nanki M. Extraction of the contours of left ventricular cavity, according with those traced by medical doctors, from left ventriculograms using a neural edge detector. PROC SPIE MED IMAG 4322: 1284-1295, 2001.

41. Suzuki K, Horiba I, Sugie N, Nanki M. Contour extraction of the left ventricular cavity from digital subtraction angiograms using a neural edge detector. SYSTEMS AND COMPUTERS IN JAPAN 34: 55-69, 2003.

42. Suzuki K., Armato III S. G., Li F., Sone S., and Doi K. Massive training artificial neural network (MTANN) for reduction of false positives in computerized detection of lung nodules in low-dose CT. MEDICAL PHYSICS 30: 1602-1617, 2003.

43. Suzuki K., Armato III S. G., Li F., Sone S., and Doi K. Effect of a small number of training cases on the performance of massive training artificial neural network (MTANN) for reduction of false positives in computerized detection of lung nodules in low-dose CT. PROC. SPIE MEDICAL IMAGING (SPIE MI), 5032: 1355-1366, 2003.

44. Suzuki K, Horiba I, Ikegaya K, Nanki M. Recognition of coronary arterial stenosis using neural network on DSA system. SYSTEMS AND COMPUTERS IN JAPAN 26: 66-74, 1995.

45. Suzuki K, Horiba I, Sugie N, Nanki M. Computer-aided diagnosis system for coronary artery stenosis using a neural network. PROC SPIE MED IMAG 4322: 1771-1782, 2001.

46. Rumelhart D E, Hinton G E, Williams R J. Learning representations of back-propagation errors. NATURE 323: 533-536, 1986.

47. Rumelhart D E, Hinton G E, Williams R J. Learning internal representations by error propagation. PARALLEL DISTRIBUTED PROCESSING (MIT Press, Cambridge) 1: 318-362, 1986.

48. G M Stephane. A theory for multiresolution signal decomposition: the wavelet representation. IEEE TRANS PATTERN ANALYSIS AND MACHINE INTELLIGENCE 11:674-693, 1989.

49. Akansu A N, Haddad R A. Multiresolution Signal Decomposition (Academic Press), 1992.

50. Oestman J W, Greene R, Rhea J T et al. Single exposure dual energy digital radiography in the detection of pulmonary nodules and calcifications. INVEST RADIOL 24: 517-521, 1989.

51. Suzuki K, Horiba I, Sugie N. Designing the optimal structure of a neural filter. IEEE NEURAL NETWORKS FOR SIGNAL PROCESSING VIII 323-332, 1998.

52. Suzuki K, Horiba I, Sugie N. A simple neural network pruning algorithm with application to filter synthesis. NEURAL PROCESSING LETTERS 13: 43-53, 2001.

53. Funahashi K. On the approximate realization of continuous mappings by neural networks. NEURAL NETWORKS 2: 183-192, 1989.

54. Barron A R. Universal approximation bounds for superpositions of a sigmoidal function. IEEE TRANS INFORMATION THEORY 39: 930-945, 1993.

55. Otsu N. A threshold selection method from gray-level histograms. IEEE TRANS SYSTEMS, MAN AND CYBERNETICS 9: 62-66, 1979.

56. Katsuragawa S, Doi K, Nakamori N, MacMahon H. Image feature analysis and computer-aided diagnosis in digital radiography: Effect of digital parameters on the accuracy of computerized analysis of interstitial disease in digital chest radiographs. MEDICALPHYSICS 17: 72-78, 1990.

57. Chakraborty D P, Winter L HL. Free-response methodology: alternate analysis and a new observer-performance experiment. RADIOLOGY 174: 873-881, 1990.

58. Metz C E. ROC methodology in radiologic imaging. INVEST RADIOL 21: 720-733, 1986.

59. Metz C E, Herman B A, Shen J H. Maximum likelihood estimation of receiver operating characteristic (ROC) curves from continuously-distributed data. STAT MED 17: 1033-1053, 1998.

60. Hanley J A, McNeil B J. A method of comparing the areas under receiver operating characteristic curves derived from the same cases. RADIOLOGY 148: 839-843, 1983.

61. W. E. L. Grimson, G. J. Ettinger, S. J. White, T. Lozano-Perez, W. M. Wells III, and R. Kikinis. An Automatic Registration Method for Frameless Stereotaxy, Image Guided Surgery, and Enhanced Reality Visualization. IEEE TRANS MED IMAG 15: 129-140, 1996.

62. Maintz, J. B. A. & Viergever, M. A. A survey of medical image registration. MEDICAL IMAGE ANALYSIS 2: 1-36, 1998.

The contents of each of these references, including patents and patent applications, are incorporated herein by reference. The techniques disclosed in the patents, patent applications, and other references can be utilized as part of the present invention.

Discussion of the Background

Chest radiography is currently one of the most frequently used examinations for chest diseases due to its low-cost, simplicity, and low radiation dose to patients. Chest radiography has been used to detect lung cancer [1-5], because some evidence suggests that early detection of lung cancer may allow a more favorable prognosis for the patient [6-9]. However, lung nodules in chest radiographs are sometimes missed, and radiologists may fail to detect lung nodules in up to 30% of cases with actual positive diagnoses [10,11]. Therefore, a computer-aided diagnostic (CAD) scheme for nodule detection in chest radiography has been investigated as a useful tool, because the computer prompt for indicating nodules would improve radiologists' detection accuracy [12,13].

Many researchers have developed CAD schemes for lung nodule detection in chest radiography [14-28]. Giger et al. developed a CAD scheme for nodule detection in chest radiography [14,15], and the performance of the CAD scheme was improved by incorporating an adaptive thresholding technique and a multiple-template matching technique by Xu et al. [16] and Li et al, respectively [17]. A major difficulty in current CAD schemes for chest radiography is to detect nodules overlapping with ribs, rib crossings, and clavicles, because a majority of false positives are caused by ribs and clavicles [16]. This results in lowering the sensitivity of a CAD scheme as well as the specificity. Because the nodules overlapping with ribs and clavicles are reported to be difficult for radiologists [29,30], detecting such nodules is important for a CAD scheme.

The present inventors have been investigating supervised nonlinear image-processing techniques based on artificial neural networks (ANNs) [32-37], which are referred to as a "neural filter" for reduction of quantum mottle in X-ray images [32-34] and a "neural edge detector" [38-41] for supervised detection of subjective edges traced by cardiologists [40,41]. The inventors have recently extended the neural filter and the neural edge detector to accommodate various pattern-classification tasks, and developed an MTANN. They have applied the MTANN for reduction of false positives in computerized detection of lung nodules in low-dose CT [42, 43].

SUMMARY OF THE INVENTION

Accordingly, an object of the present invention is to provide a novel image-processing method for modifying an appearance of an anatomical structure in a medical image. In particular, an object of this invention is to develop a novel image-processing method for suppressing the contrast of ribs and clavicles in chest radiographs by means of a trained image processing device. In one embodiment, a multi-resolution massive training artificial neural network (MTANN) is used as the image processing device.

According to a first aspect of the present invention, there is provided a method, system, and computer program product for modifying an appearance of an anatomical structure in a medical image, comprising: (1) acquiring, using a first imaging modality, a first medical image that includes the anatomical structure; (2) applying the first medical image to a trained image processing device to obtain a second medical image, corresponding to the first medical image, in which the appearance of the anatomical structure is modified; and (3) outputting the second medical image, wherein the image processing device is trained using a teacher image obtained from a second imaging modality different from the first imaging modality. In addition, the method may further comprise identifying an abnormality in the second medical image using a second image processing device, wherein the appearance of the anatomical structure is suppressed in the second medical image.

According to a second aspect of the present invention, there is provided a method, system, and computer program product for modifying an appearance of an anatomical structure in a medical image, comprising: (1) acquiring a first medical image that includes the anatomical structure; (2) processing the first medical image to obtain plural processed images, wherein each of the plural processed images has a corresponding image resolution; (3) applying the plural processed images to respective multi-training artificial neural networks (MTANN) to obtain plural output images, wherein each MTANN is trained to detect the anatomical structure at one of the corresponding image resolutions, and the appearance of the anatomical structure is enhanced in each of the plural output images; (4) combining the plural output images to obtain a second medical image, wherein the appearance of the anatomical structure is enhanced in the second medical image; and (5) outputting the second medical image.

According to another aspect of the present invention, the above processing step comprises: (1) downsampling and averaging the first medical image to obtain a medium resolution image; (2) upsampling the medium resolution image to obtain an expanded medium resolution image; (3) calculating a high resolution difference image by subtracting the expanded medium resolution image from the first medical image; (4) downsampling and averaging the medium resolution image to obtain a low resolution image; (5) upsampling the low resolution to obtain an expanded low resolution image; (6) calculating a medium resolution difference image by subtracting the expanded low resolution image from the medium resolution image; and (7) including the high resolution difference image, the medium resolution difference image, and the low resolution image in the plural processed images.

According to yet another aspect of the present invention, the above applying step comprises: (1) dividing the first medical image into a plurality of overlapping sub-regions; (2) obtaining an output pixel value by simultaneously applying each pixel in one of the plural sub-regions to the MTANN that is trained to detect the anatomical structure at one of the corresponding image resolutions; (3) setting, to the output pixel value, a corresponding pixel in the output image associated with the MTANN that is trained to detect the anatomical structure at the one of the corresponding image resolutions; and (4) repeating the preceding obtaining and setting steps for each sub-region of the plurality of sub-regions.

According to yet another aspect of the present invention, the above combining step comprises: upsampling an output image of the plural output images having a lowest image resolution to obtain an expanded low resolution image; calculating a medium resolution output image by adding (1) the expanded low resolution image, and (2) an output image of the plural output images having a medium image resolution, the medium image resolution being greater than the lowest image resolution and less than a highest image resolution; upsampling the medium resolution output image to obtain an expanded medium resolution image; and calculating the second medical image by adding (1) the expanded medium resolution image, and (2) an output image of the plural output images having the highest image resolution.

According to the present invention, the method, system, and computer program product for modifying an appearance of an anatomical structure in a medical image further comprises: (1) independently training each MTANN to detect the anatomical structure in a spatial frequency range equivalent to one of the corresponding image resolutions; and (2) providing dual-energy subtraction images of the anatomical structure as teacher images to train each MTANN. Further, each MTANN is trained using a modified back-propagation algorithm.

According to another aspect of the present invention, there is provided a method, system, and computer program product for training an image processing device to modify an appearance of an anatomical structure in a medical image, comprising: (1) acquiring, using a first imaging modality, a first medical image that includes the anatomical structure; (2) acquiring, using a second imaging modality, a teacher image in which the appearance of the anatomical structure is modified; (3) applying the first medical image to the image processing device to obtain a second medical image; (4) calculating at least one error based on the teacher image and the second medical image; (5) modifying the image processing device based on the at least one error calculated in the calculating step.

According to another aspect of the present invention, there is provided a method, system, and computer program product for modifying an appearance of an anatomical structure in a medical image, comprising: (1) acquiring a first medical image that includes the anatomical structure; (2) processing the first medical image to obtain plural processed images, wherein each of the plural processed images has a corresponding image resolution; (3) applying the plural processed images to respective image processing devices, wherein each image processing device is configured to modify the anatomical structure at one of the corresponding image resolutions; (4) combining the plural output images to obtain a second medical image in which the appearance of the anatomical structure is modified in the second medical image; and (5) outputting the second medical image.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, in which like reference numerals refer to identical or corresponding parts throughout the several views, and in which:

FIG. 2A illustrates the multi-resolution decomposition method, in which lower resolution images are produced by alternatively performing down-sampling and subtracting;

FIG. 3C illustrates the steps in the method of modifying the appearance of an anatomical structure in a medical image, according to the present invention;

FIGS. 7A and 7B show chest radiographs with rib suppression and FIGS. 7C and 7D show the corresponding soft-tissue images obtained by use of a dual-energy subtraction method;

FIGS. 8A-I show the results for non-training chest radiographs with solitary pulmonary nodules, of which FIGS. 8A-8C show original chest radiographs, FIGS. 8D-8F show chest radiographs with rib suppression, and FIGS. 8G-8I show the corresponding soft-tissue images obtained by use of a dual-energy subtraction method;

FIGS. 9A-9F show non-training conventional chest radiographs with solitary pulmonary nodules, and FIGS. 9G-9L show the corresponding chest radiographs with rib suppression;

FIGS. 10A and 10B show non-training conventional chest radiographs with interstitial diseases, and FIGS. 10C and 10D show the corresponding chest radiographs with rib suppression;

FIGS. 16A-16F show the effect of the background-trend-correction and the contrast normalization, of which FIG. 16A shows ROIs including nodules which were extracted from conventional chest radiographs, FIG. 16B show the background-trend-corrected ROIs for nodules, FIG. 16C shows the contrast-normalized ROIs for nodules, FIG. 16D shows ROIs including non-nodules, FIG. 16E shows the background-trend-corrected ROIs for non-nodules, and FIG. 16F shows the contrast-normalized ROIs for non-nodules;

FIGS. 17A-17E and 18A-18E show training samples of nodules and non-nodules, respectively, of which FIGS. 17A and 18A show ROIs extracted from conventional chest radiographs, FIGS. 17B and 18B show corresponding ROIs from the rib-suppressed chest radiographs obtained by use of the multi-resolution MTANN for rib suppression, FIGS. 17C and 18C show the background-trend-corrected ROIs, FIGS. 17D and 18D show the contrast-normalized ROIs for input images to the MTANN, and FIGS. 17E and 18E show the corresponding output images of the trained MTANN;

FIGS. 19A and 20A show four non-training nodules and four non-training non-nodules, respectively, and FIGS. 19B and 20B show the corresponding output images of the trained MTANN;

DETAILED DESCRIPTION OF THE PREFERRED EMBODIMENTS

Suppression of Anatomical Structure

The present invention is directed to a system for modifying the appearance of an anatomical structure in a medical image. The system includes an image processing device that is trained to modify the appearance of a particular anatomical structure (e.g., ribs in a chest radiograph). Massive-training artificial neural networks (MTANNs) are particularly well suited to serve as the image processing device, although other the present invention is not limited to the use of MTANNs. Any image processing device that can be trained to recognize a particular anatomical structure using a teacher image may be used to practice the method of the present invention. For example, image-learning machines could be used as the image processing devices in the present invention. Image-learning machines include various learning machines that can be applied to image processing, e.g., artificial neural networks, multi-class classifiers, and sophisticated filters that are trainable with image samples. The artificial neural networks include a multilayer perceptron, a learning-vector quantization network, the Hopfield network, the Boltzmann machine, a radial basis function network, and a self-organizing feature map. The multi-class classifiers include multi-class linear discriminant analysis, a multi-class Bayesian classifier, and a multi-class k-nearest neighbor classifier. The sophisticated trainable filters include adaptive filters, nonlinear filters with least-squares algorithms, recursive nonlinear filters with recursive least-squares algorithms.

Figure 1:
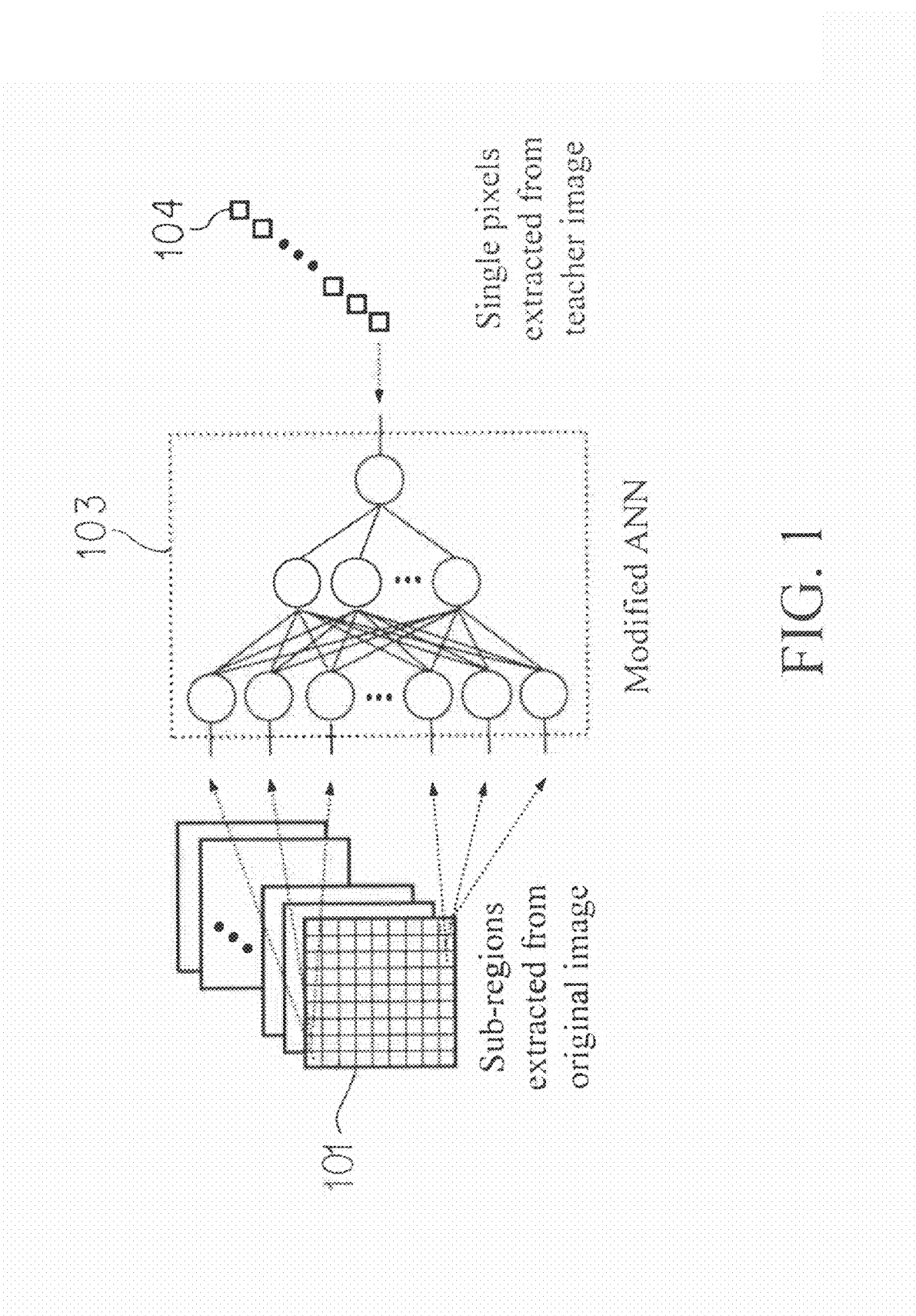
FIG. 1 illustrates a system for training of a massive training artificial neural network (MTANN), in which the pixel values in the sub-regions extracted from the original image are entered as inputs to the MTANN, and the single teacher pixel corresponding to the input sub-region is extracted from the teacher image and used as a teacher value.

FIG. 1 illustrates the architecture and the training method of an MTANN 103 according to the present invention. The MTANN 103 is a highly nonlinear filter that can be trained by using input images and corresponding teacher images. The MTANN 103 consists of a modified multilayer ANN configured to operate on image data directly. The MTANN 103 employs a linear function, instead of a sigmoid function, as the activation function of the unit in the output layer because the characteristics of an ANN are significantly improved with a linear function when applied to the continuous mapping of values in image processing [44,45]. The pixel values of the inputted images of original chest radiographs are normalized first such that a pixel value of zero is zero and a pixel value of 1,023 is one. The inputs of the MTANN 103 are the pixel values in a local window $R_S$ on a chest radiograph. The output of the MTANN 103 is a continuous value, which corresponds to the center pixel in the local window, represented by $$f(x,y)=NN\{I(x,y)\}=NN\{g(x-i,y-j)|i,j \in R_S\}, \quad (1)$$

where f(x,y) is the estimate for the teacher value, x and y are the indices of coordinates, NN{•} is the output of the modified multilayer ANN, I(x,y) is the input vector to the modified multilayer ANN, the elements of which are the normalized pixel values in the local window $R_S$, and g(x,y) is the normalized pixel value. Only one unit is employed in the output layer. The output image is obtained by scanning of an input image with the MTANN.

The teacher image is a desired image for suppressing ribs in a chest radiograph. The input chest radiograph is divided pixel-by-pixel into a large number of overlapping sub-regions 101. The size of each sub-region 101 corresponds to that of the local window $R_S$ of the MTANN. The MTANN is trained by presenting each of the input sub-regions 101 together with each of the corresponding teacher single pixels 104.

The error to be minimized by training is defined by $$E = \frac{1}{2P}\sum_p \{T^{(p)} - f^{(p)}\}^2, \quad (2)$$

where p is a training pixel number, T(p) is the pth training pixel in the training regions $R_T$ in the teacher images, f(p) is the pth training pixel in the training region $R_T$ in the output images, and P is the number of training pixels. The MTANN 103 is trained by a modified back-propagation (BP) algorithm [44,42], which was derived for the structure described above, i.e., a linear function is employed as the activation function of the unit in the output layer, in the same way as the original BP algorithm [46,47].

Ribs in chest radiographs include various spatial frequency components. For a single-MTANN, to suppress ribs containing such various frequencies is difficult because the capability of a single MTANN is limited, i.e., the capability depends on the size of the local window 101 of the MTANN. Because the training of the MTANN takes a substantially long time, it is practically difficult to train the MTANN with a large local window. In order to overcome this issue, a multi-resolution decomposition/composition technique is employed [48,49].

Figure 2B:
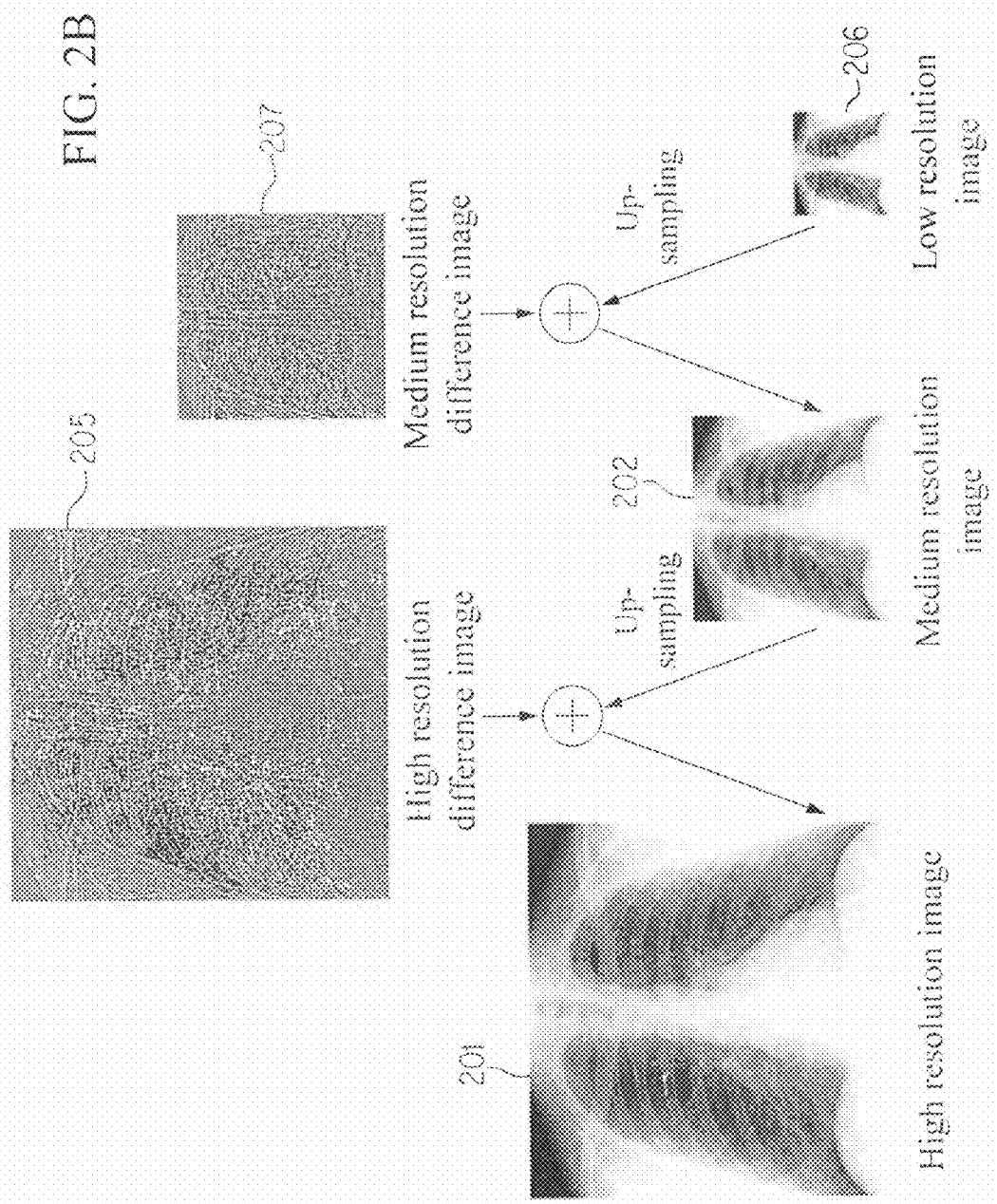
FIG. 2B illustrates the multi-resolution composition method, in which exactly the same original resolution image can be obtained from multi-resolution images by performing the multi-resolution composition method.

The multi-resolution decomposition technique illustrated in FIG. 2A is a technique for decomposing an original high-resolution image 201 into different-resolution images. First, a medium resolution image $g_M(x,y)$ 202 is obtained from an original high resolution image $g_H(x,y)$ 201 by performing down-sampling with averaging, i.e., four pixels in the original image are replaced by a pixel with the mean value for the four pixel values, represented by $$g_M(x,y) = \frac{1}{4} \sum_{i,j \in R_{22}} g_H(2x-i, 2y-j) \qquad (3)$$

where $R_{22}$ is a 2×2 pixels-region.

The medium resolution image 202 is enlarged by performing up-sampling with zeroth-order holding, i.e., a pixel in the medium resolution image 202 is replaced by four pixels with the same pixel value, as follows:

$$g_M^U(x,y) = g_M(x/2, y/2). \qquad (4)$$

Then, a high resolution difference image $d_H(x,y)$ 205 is obtained by subtracting the enlarged medium resolution image from the high resolution image, represented by $$d_H(x,y) = g_H(x,y) - g_M^U(x,y). \qquad (5)$$

These procedures are performed alternately to produce further lower resolution images 206 and medium resolution difference images 207. Thus, multi-resolution images having various frequencies are obtained by use of the multi-resolution decomposition method.

The important characteristic of this method is that exactly the same original resolution image $g_H(x,y)$ can be obtained from the multi-resolution images, $d_H(x,y)$ and $g_M(x,y)$, by performing inverse procedures, called multi-resolution composition (shown in FIG. 2B), as follows:

$$g_H(x,y) = g_M(x/2, y/2) + d_H(x,y). \qquad (6)$$

Therefore, different-resolution images can be processed independently instead of original images directly. Thus, the processed original image can be obtained by composing the processed different-resolution images.

The dual-energy subtraction technique [50] can be used to obtain the teacher images for suppression of ribs in chest radiographs. Dual-energy subtraction is a technique for obtaining a soft-tissue image and a bone image by use of the energy dependence of x-ray attenuation by different materials. Chest radiographs are used as input images to an MTANN, and the corresponding bone images that are obtained by use of the dual-energy subtraction technique are used as the teacher images for suppression of ribs and clavicles in chest radiographs. Note that, in this example, the chest radiographs and the teacher images are obtained using different imaging modalities.

Figure 3A:
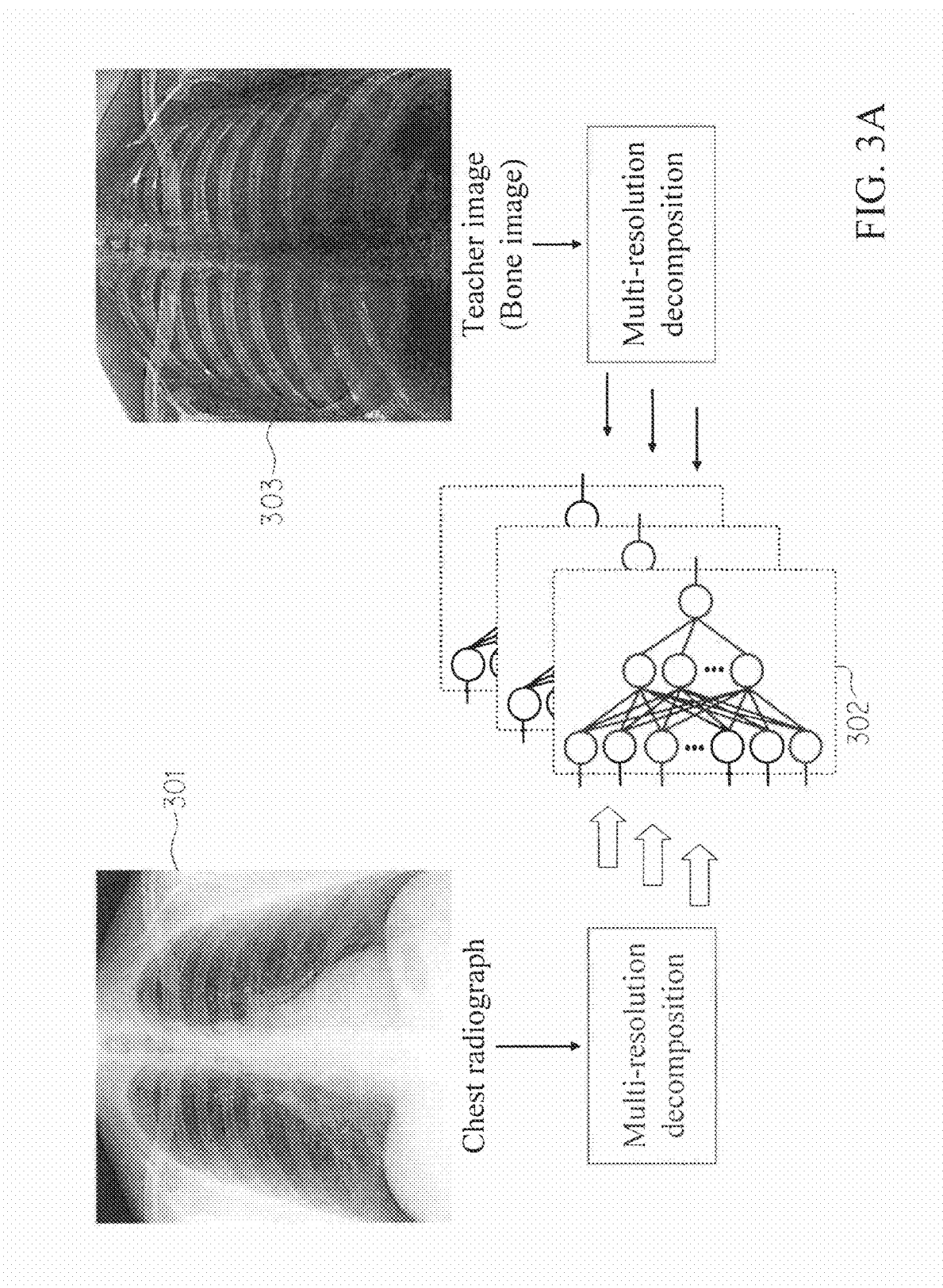
FIGS. 3A and 3B illustrate the training phase and the filtering phase of a trained multi-resolution MTANN, respectively, in which the input chest radiograph and the teacher image are decomposed into multi-resolution images, and each of multi-resolution images is used as the input and teacher images for each of the corresponding resolution MTANN in the multi-resolution MTANN.
Figure 3B:
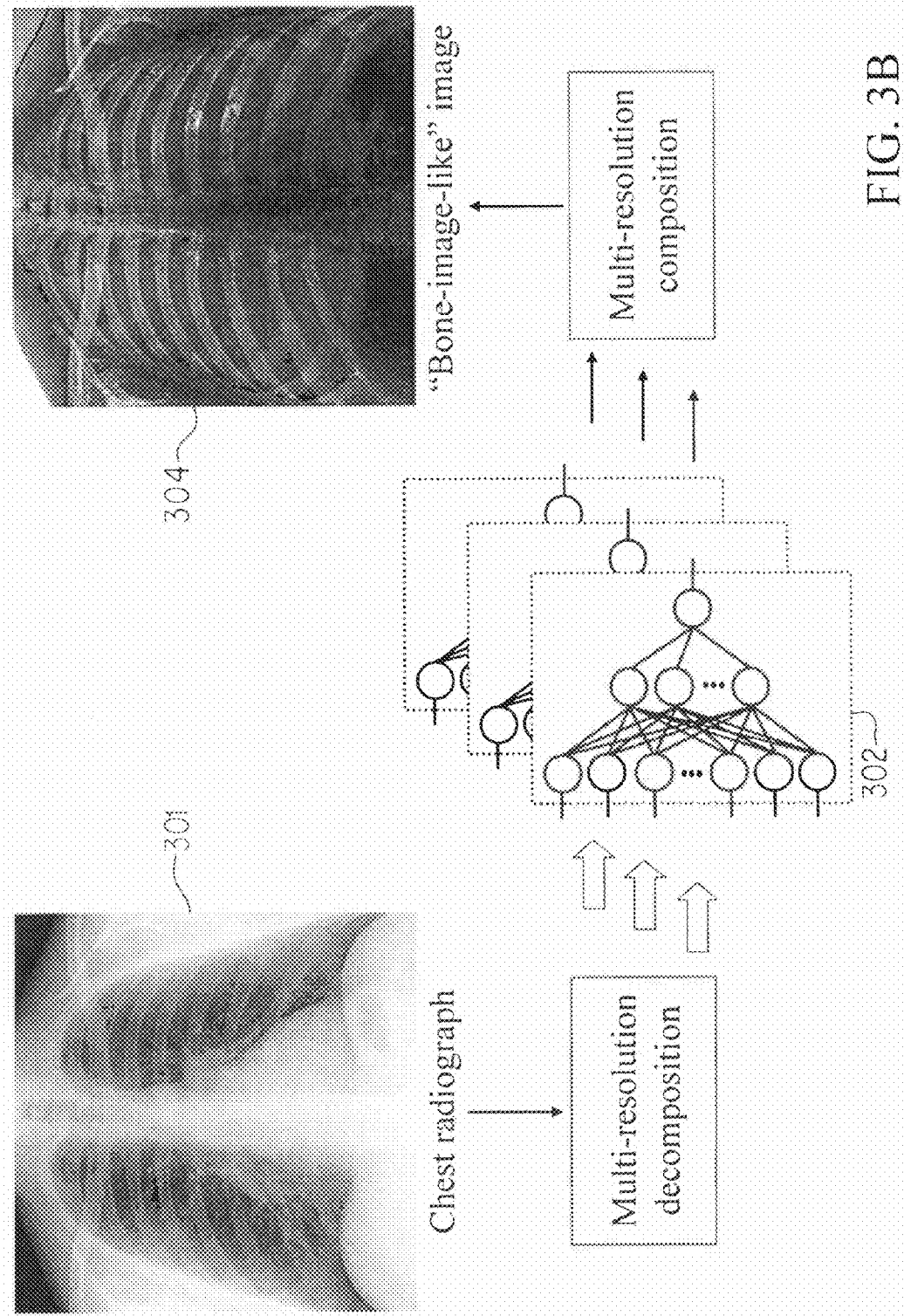

In order to effectively suppress ribs having various frequencies, the multi-resolution decomposition and composition techniques are employed to develop a multi-resolution MTANN consisting of three MTANNs was for three different-resolution images, as illustrated in FIGS. 3A and 3B. Each MTANN is an expert for a certain resolution, i.e., a low-resolution MTANN is in charge of low frequency components of ribs, a medium-resolution MTANN is for medium frequency components, and a high-resolution MTANN is for high frequency components.

In FIG. 3A, the input chest radiographs 301 and the corresponding teacher images (bone image) 303 are decomposed into sets of different-resolution images, which are used for training the MTANNs 302 in the multi-resolution MTANN. Each resolution MTANN is trained independently with the corresponding resolution images. After training, the MTANNs are expected to be able to produce different-resolution images.

The different resolution output images are composed to provide a complete high resolution image 304 (which is expected to be similar to the teacher image) by use of the multi-resolution composition technique (shown in FIG. 3B), which then is subtracted from the chest radiograph 301. In particular, as discussed below with regard to FIG. 3C, the respective output images of the MTANNs shown in FIG. 3B are composed according to the process shown in FIG. 2B. Thus, the multi-resolution MTANN would be able to produce a "soft-tissue-image-like" image where ribs would be substantially suppressed; therefore, this image processing may be considered as a "rib suppression" technique. It is possible to directly use soft-tissue images as the teacher images for the rib suppression in chest radiographs. Because the pattern variations of soft-tissues would be greater than those of ribs, a greater number of MTANNs would need to be used in the multi-resolution MTANN.

FIG. 3C illustrates the steps in the method of modifying the appearance of an anatomical structure in a medical image according to the present invention.

In step 310, a medical image that includes an anatomical structure of interest is acquired using a particular imaging modality (e.g., CT, MRI, US, X-ray imaging system, etc.). Next, in step 312, the acquired medical image is down-sampled and averaged to produce a lower resolution image, as shown in FIG. 2A. (See the description of FIG. 2A in which a medium-resolution image is created from an original high-resolution medical image by downsampling and averaging.)

In step 314, the lower resolution image produced in step 312 is upsampled to obtain an expanded/enlarged image. (See equation (4).)

Next, in step 316, the expanded image obtained in step 314 is subtracted from the acquired medical image to obtain a difference image highlighting a particular spatial frequency range.

In step 318, an inquiry is made as to whether further image decomposition is desired. In the example shown in FIG. 2A, two difference images are produced. However, additional difference images may be produced and used in the method of the present invention.

If the answer to the inquiry of step 318 is YES, steps 312-316 are repeated starting with the lower resolution image produced in the previous step 312. Otherwise, the method proceeds to step 320.

In step 320, each difference image produced as well as the last lower resolution image produced by step 312 are input into respective image processing devices such as the MTANNs described above. Each respective image processing device or MTANN has been trained to recognize the anatomical structure at the spatial frequency that corresponds to the pixel resolution of the image input into the respective image processing device or MTANN. The training of each image processing device is accomplished with plural teacher images in which the appearance of the anatomical structure is either enhanced or suppressed compared to the original medical image. Further, according to the present invention, the original medical image and the teacher images may be obtained using different imaging modalities. For example, teacher images in which the contrast of the ribs is enhanced may be dual-energy subtraction images of the chest.

In step 322, the output image from the MTANN into which the last lower resolution image produced in step 312 was input is selected as a starting image for the image reconstruction/composition steps.

In step 324, the image selected in step 322 is upsampled to obtain an expanded image.

Next, in step 326, the expanded image obtained in step 324 is added to an output image of one of the MTANNs corresponding to the next highest resolution input image. In particular, the input to this MTANN was a difference image having a next higher resolution with respect to the resolution of the image selected in step 322.

In step 328, an inquiry is made as to whether there are more output images to be combined. If the answer is YES, steps 324 and 326 are repeated starting with the image produced in step 326. Otherwise, the method proceeds to step 330.

In step 330, the last image produced by step 326 is output as an image in which the appearance of the anatomical structure is enhanced. This image may then be subtracted from the first medical image (or a similar image acquired using a different imaging modality from the first medical image) to produce an output image in which the appearance of the anatomical structure is suppressed.

Figure 11:
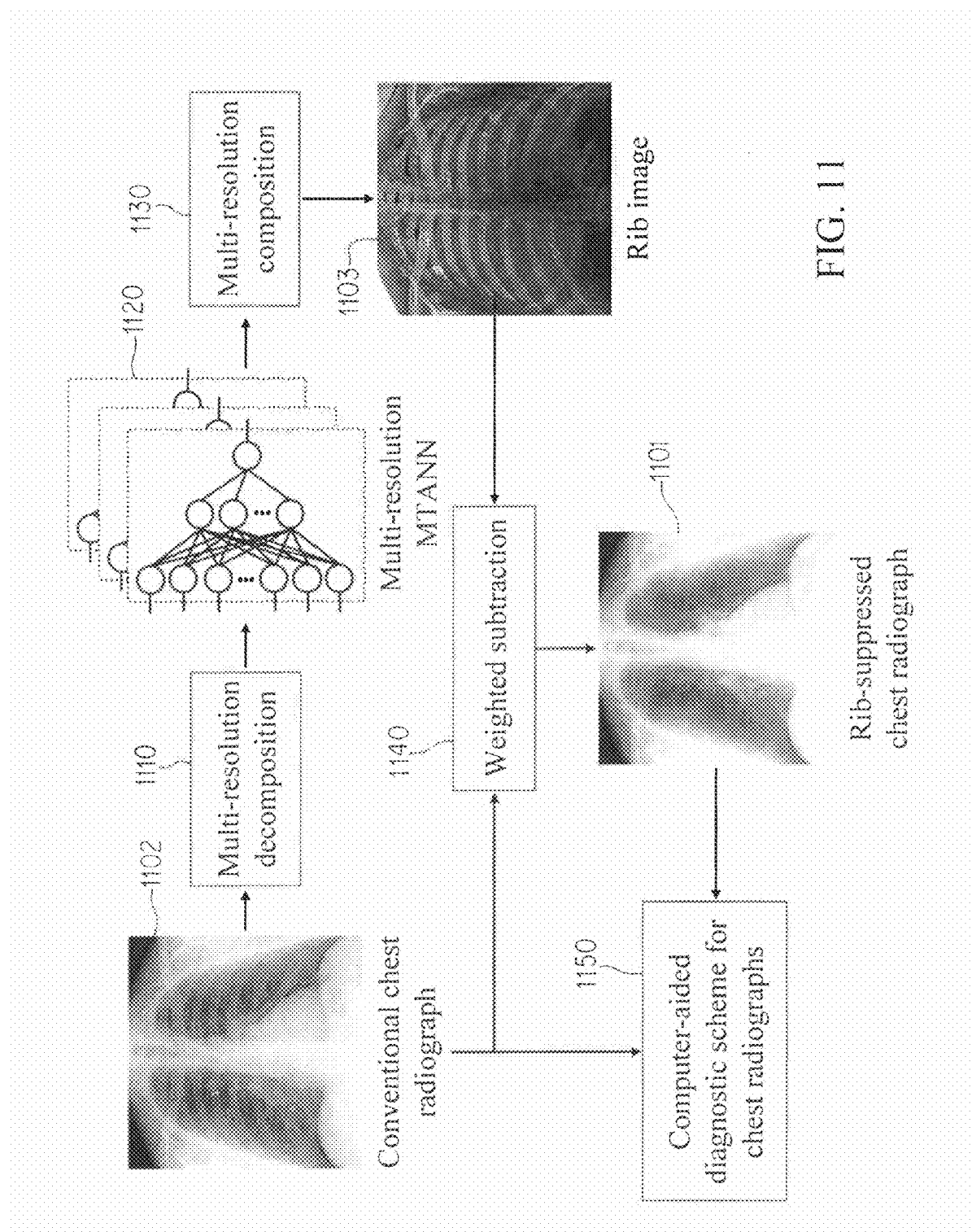
FIG. 11 illustrates a CAD system for chest radiographs combined with the rib suppression method of the present invention.

A system for practicing the method of FIG. 3C is shown in FIG. 11. A medical image (e.g., a chest radiograph 1102) is obtained by an image acquisition unit (not shown). As discussed above, the medical image is then applied to a multi-resolution decomposition unit 1110, multi-resolution MTANNs 1120, and a multi-resolution composition unit 1130 in sequence. The result is an enhanced image in which an anatomical structure is enhanced (e.g., rib image 1103). The medical image and the enhanced image may be subtracted by the weighted subtraction unit 1140 to produce a suppressed image in which an anatomical structure is suppressed (e.g., rib-suppressed chest image 1101). Finally, the suppressed image and the original medical image may be used in a CAD unit 1150 to detect lesions or other abnormalities.

A database used to study the above methods consisted of 137 conventional chest radiographs with solitary pulmonary nodules from the Digital Image Database developed by the Japanese Society of Radiological Technology [31]. The chest radiographs were collected from 14 medical institutions. The absence and presence of nodules in the chest radiographs were confirmed by use of CT examinations. The locations of all nodules were confirmed by three chest radiologists. The chest radiographs were digitized with a 0.175-mm-pixel size, a matrix size of 2,048×2,048, and 12-bit gray-scale levels. The sizes of nodules ranged from 12.7 to 44.5 mm, and the average size was 24.6 mm. The database contained 93 malignant nodules and 44 benign nodules, which were confirmed by histologic and cytologic examinations or follow-up examinations.

In order to train the multi-resolution MTANN and validate the results, a dual-energy chest radiograph database consisting of 20 chest radiographs and the corresponding soft tissue images and bone images was used. The dual-energy chest radiographs were acquired with a computed radiography system with dual-energy subtraction (FCR 9501 ES; Fuji Medical Systems) at The University of Chicago Hospitals. Ten of 20 chest radiographs were "abnormal" cases with solitary pulmonary nodules, and other 10 chest radiographs were "normal" cases (i.e., nodule-free cases). All nodules were confirmed by use of CT examinations. The matrix size of the images was 1,760×1,760 pixels, and the gray scale was 10-bit. For efficiency, the size of all conventional chest radiographs and dual-energy chest radiographs was reduced to 512×512 pixels with a 10-bit gray-scale levels.

Four chest radiographs and the corresponding bone images from the dual-energy chest radiograph database for training the multi-resolution MTANN were used. The MTANN can be trained with a very small number of cases, because the MTANN is trained with a large number of sub-regions extracted from input images [42,43].

Figure 4A:
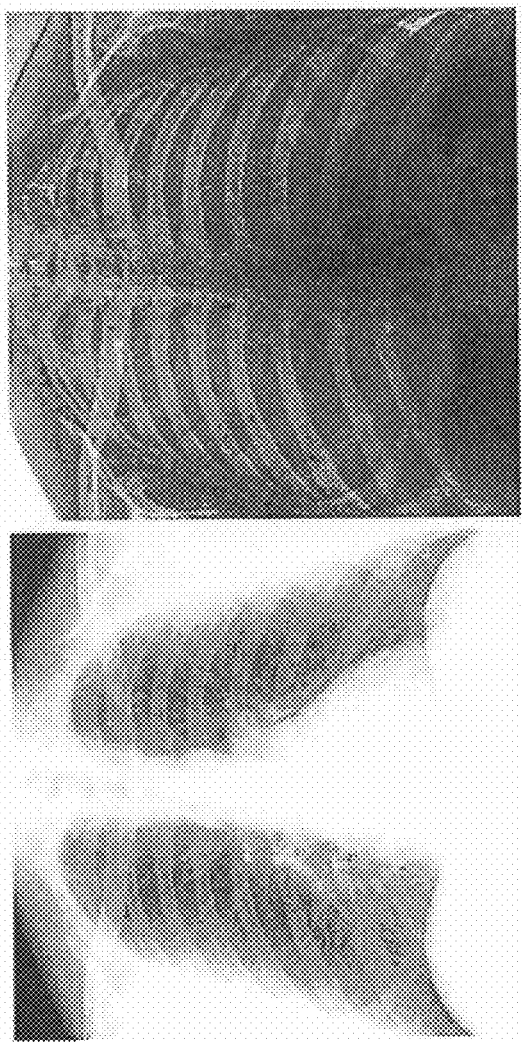
FIGS. 4A and 4B show conventional chest radiograph input images.
Figure 4B:
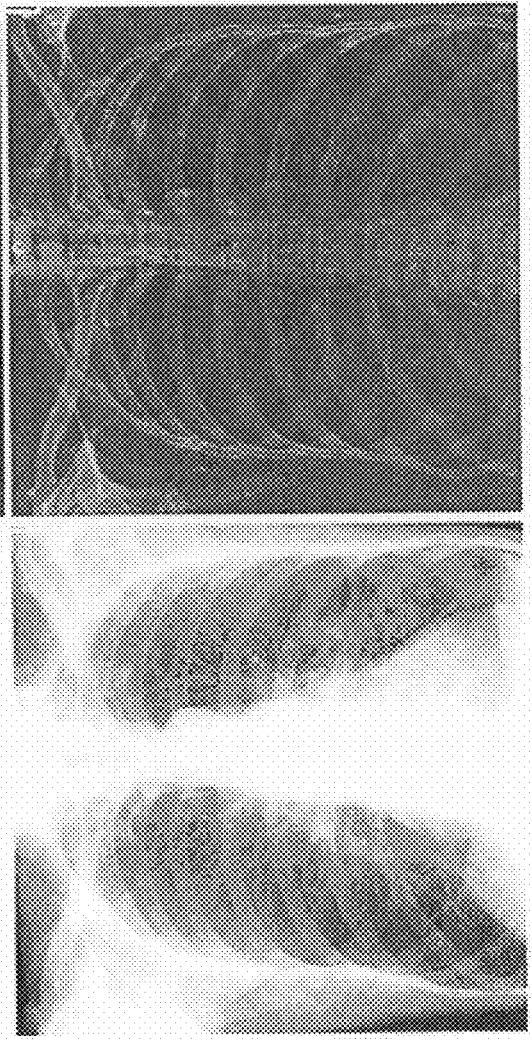
Figure 4C:
FIGS. 4C and 4D show the corresponding bone image teacher images obtained by use of a dual-energy subtraction technique.
Figure 5A:
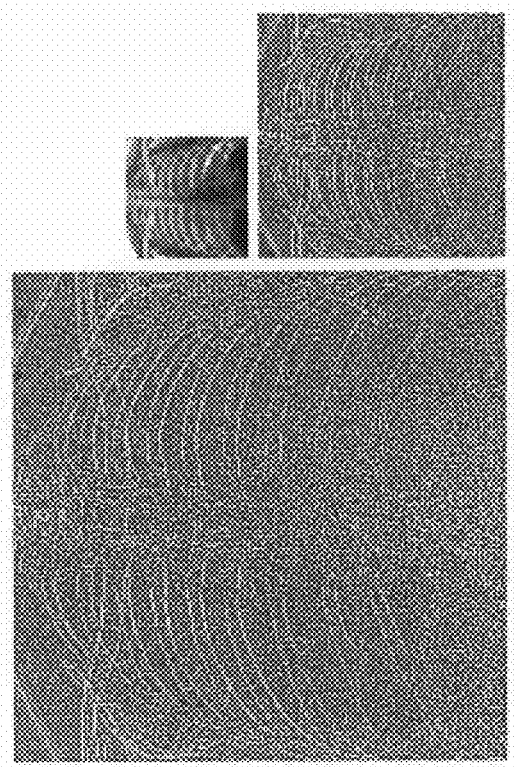
FIGS. 5A and 5B show three resolution images obtained by use of a multi-resolution decomposition method, which correspond to the input image and the teacher images in FIGS. 4A-4D (upper images)
Figure 5B:
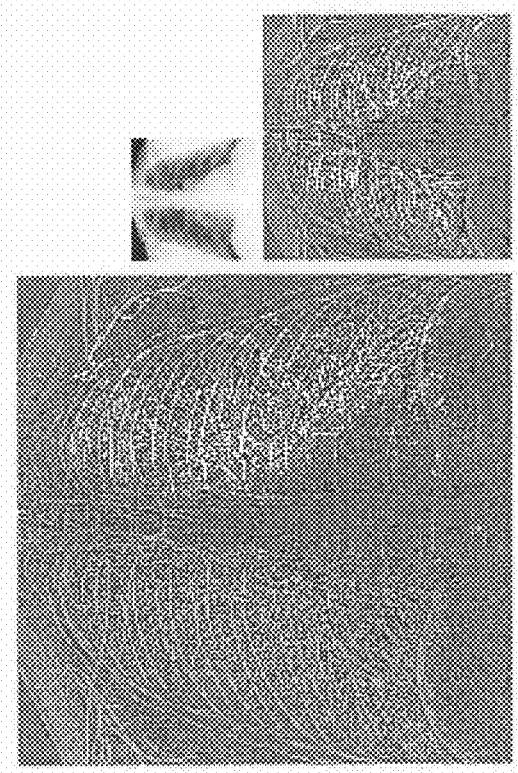

One typical normal case and three cases with nodules were used as training cases. FIGS. 4A (input image) and 4C (teacher image) show a normal case, while FIGS. 4B (input image) and 4D (teacher images) show an example of the nodule cases used for training. The normal case was used mainly for training for ribs, clavicles, soft tissues such as lung vessels, and the relationship among them. The nodule cases were used mainly for training for nodules and the relationship between nodules and ribs. The chest radiographs and the bone images were decomposed into three different-resolution images, i.e., high-resolution difference images, medium-resolution difference images, and low-resolution images, by use of the multi-resolution decomposition technique; thus, the number of MTANNs in the multi-resolution MTANN was three. FIGS. 5A and 5B show decomposed chest radiographs and decomposed bone images for the normal case images illustrated in FIGS. 4A and 4C, respectively.

In order to train the entire features in lung regions, 5,000 pairs of training samples were extracted randomly from manually-traced lung regions in each of different resolution normal chest radiographs and each of the corresponding bone images. Only the lung regions were used for training. In order to learn the relationship between nodules and ribs, training samples for nodules were extracted from the manually-traced nodule regions, which were enough to cover the nodules. Training samples from the normal case and those from the nodule cases were combined, and used for training the multi-resolution MTANN.

The size $R_S$ of the local window of the MTANNs in the multi-resolution MTANN was determined by using a method for designing the structure of an ANN [51,52]. The method is a sensitivity-based pruning method, i.e., the sensitivity to the training error was calculated when a certain unit was removed virtually, and the unit with the minimum training error was removed. Removing the redundant units in the input layer and retraining for recovering the potential loss due to the removal were performed alternately, resulting in a reduced structure where redundant units were removed.

As a result, the size of the local window was determined to be 9×9 pixels. A three-layer structure was employed for the structure of the MTANNs, because any continuous mapping can be realized approximately by three-layer ANNs [53,54]. The number of hidden units was determined empirically to be 20; thus, the numbers of input, hidden, and output units were 81, 20, and 1, respectively.

With the parameters above, the trainings of three MTANNs in the multi-resolution MTANN, i.e., a high-resolution MTANN for difference images, a medium-resolution MTANN for difference images, and a low-resolution MTANN, were performed 1,000,000 times. The trainings converged with mean absolute errors of 0.081, 0.086, and 0.017, respectively. After training, the output images of the MTANNs in the multi-resolution MTANN were composed into an output image by use of the multi-resolution composition technique.

Figure 4D:
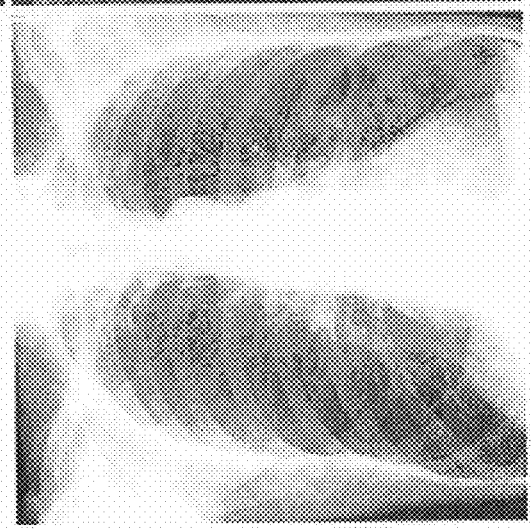
Figure 6B:
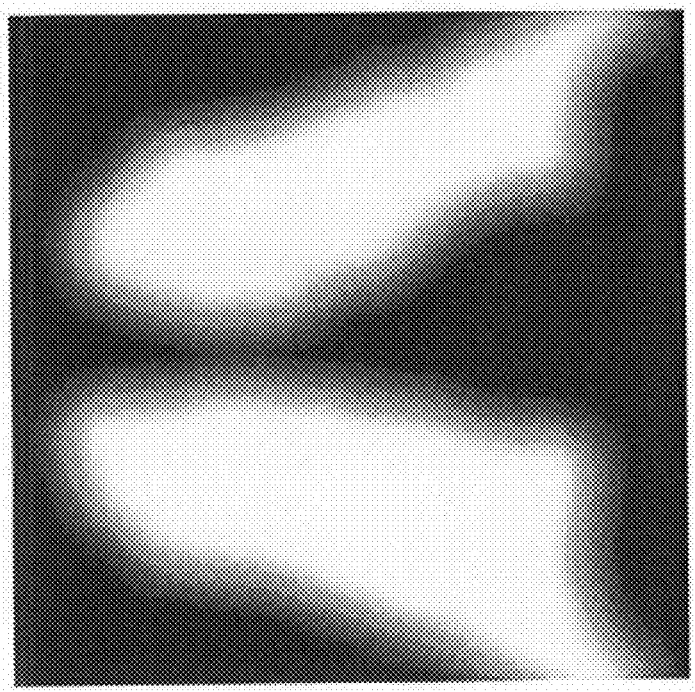
FIGS. 6A and 6B show the output image of the trained multi-resolution MTANN and the mask image, respectively, for the corresponding input image of FIG. 4A and teacher image of FIG. 4C.
Figure 6A:
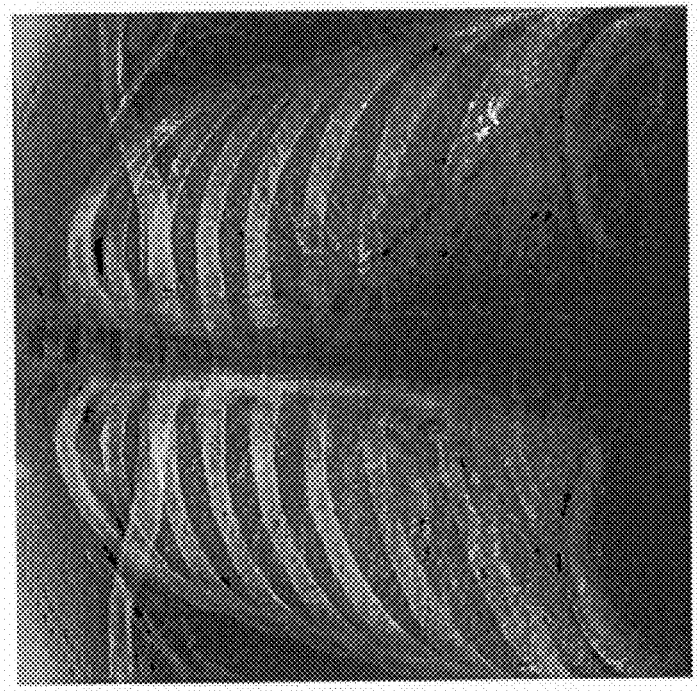

FIG. 6A shows the composed output image, i.e., the bone-image-like image, of the trained multi-resolution MTANN. The ribs are extracted effectively in the composed output image, and the image is similar to the bone images in FIGS. 4C and 4D. There are some remaining fine structures of soft tissues in the output image. Some small block artifacts are observed at the edges of soft tissues with high contrast such as the diaphragm. In order to reduce the fine structures and the block artifacts in the output image, a Gaussian filter with a standard deviation of 0.8 pixels was applied on the output image.

The outside of the lung regions, typically the shoulders and the spine, is unstable, because the multi-resolution MTANN was not trained with the outside region. To avoid this problem, the image for masking the outside regions of the lung regions was created from the original chest radiograph by a method described below.

Thresholding was performed on the chest radiograph to segment lung regions. The threshold value was determined by use of Otsu's threshold selection [55]. Otsu's threshold selection is a technique for determining a threshold from a histogram. This method selects the lowest point between two classes in the histogram automatically (it is formulated as linear discriminant analysis). The method involves minimizing the ratios of between-class variance to the total variance. Since the segmented lung regions tended to be smaller than the desired ones, the dilation operation of morphological filtering with a 12×12 pixels-kernel was applied on the segmented lung regions to expand them. A Gaussian filter with a standard deviation of 40 pixels was applied for smoothing the edges of the segmented lung region. FIG. 6B shows the resulting mask image. The smoothed bone-image-like image $f_S(x, y)$ of the multi-resolution MTANN was subtracted from the corresponding chest radiograph $g(x,y)$ with the mask image $m(x,y)$ as follows:

$$s(x,y) = g(x,y) - w_S \times f_S(x,y) \times m(x,y), \quad (7)$$

where $w_S$ is a weighting parameter for determining the contrast of ribs. By changing the weighting parameter $w_S$, the processed chest radiographs with different contrast of ribs can be obtained.

In addition to the rib suppression, the visibility of opacities in lung regions was improved. The contrast enhancement of lung regions was performed by use of a look-up table and the mask image, represented by $$s_E(x,y) = \{1 - m(x,y)\} \times s(x,y) + m(x,y) \times L\{s(x,y)\}, \quad (8)$$

where $L\{\bullet\}$ is a look-up table represented by $$L(u) = a \times u + b, \quad (9)$$

where a is a gain parameter, and b is a background parameter.

FIGS. 7A and 7B shows the chest radiographs with rib suppression, which were obtained with a weighting parameter of 1.0. The corresponding soft tissue images obtained by use of the dual-energy subtraction technique are shown in FIGS. 7C and 7D. The contrast of ribs is substantially suppressed, while the visibility of soft tissue such as lung vessels and nodules is mostly maintained. In order to validate the results, the trained multi-resolution MTANN was applied to non-training cases.

Figure 8B:
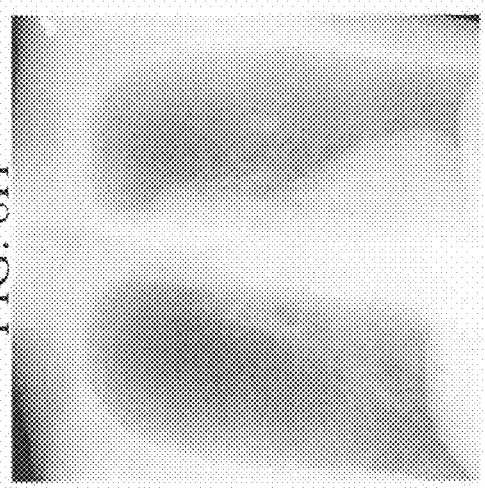
Figure 8C:
Figure 8E:
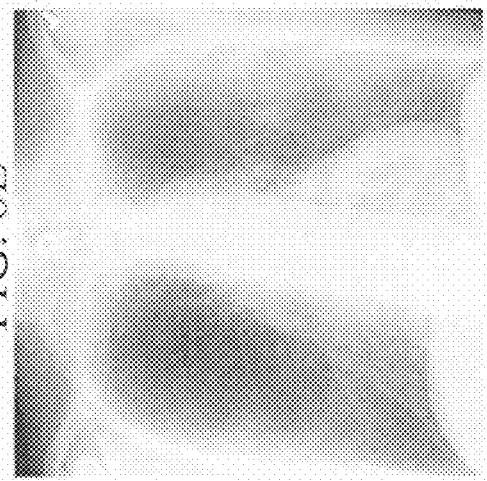
Figure 8F:
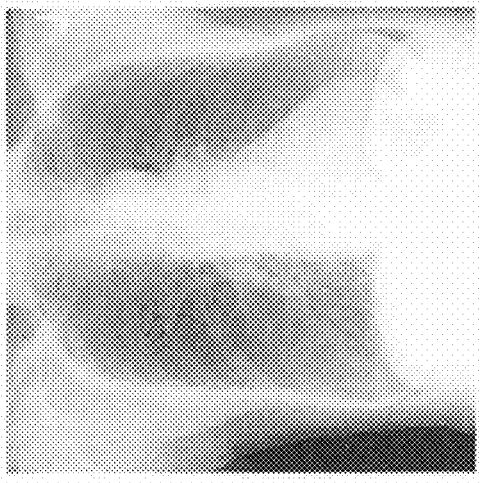
Figure 8H:
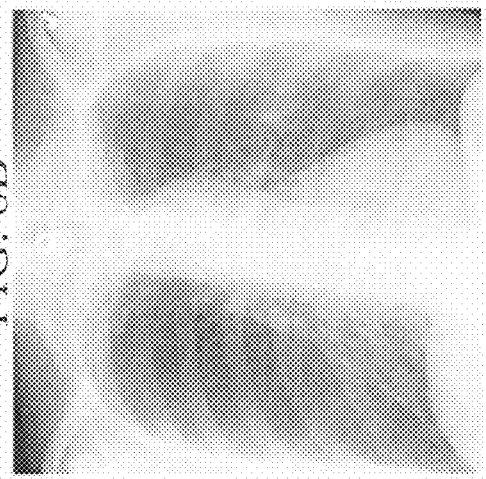
Figure 8I:
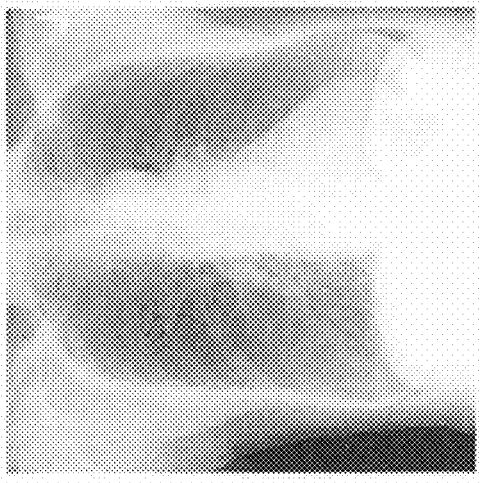

FIGS. 8D-8F show the processed chest radiographs with solitary pulmonary nodules and the corresponding soft tissue images (FIGS. 8G-8I). The contrast of ribs in the output images is substantially suppressed, while the visibility of nodules is maintained. The effect of the rib suppression was evaluated by measuring the contrast of ribs in both original chest radiographs (shown in FIGS. 8A-8C) and chest radiographs with rib suppression. The average contrast of the 6th left ribs, that of the 6th right ribs, that of the 9th left ribs, and that of the 9th right ribs were 3.8%, 9.1%, 5.8%, and 12.9%, respectively. The results demonstrated that the contrast of ribs in chest radiographs almost disappeared, and was reduced to about 8% in the processed chest radiographs, while the contrast of nodules was comparable in chest radiographs and processed images.

The trained multi-resolution MTANN was applied to non-training chest radiographs with solitary pulmonary nodules, which were acquired with conventional radiography systems in several different medical institutions. FIGS. 9A-9F show the original chest radiographs, while the chest radiographs with rib suppression are shown in FIGS. 9G-9L. The ribs and clavicles in chest radiographs are suppressed substantially, while the visibility of nodules and lung vessels is maintained. The distinction between nodules and other anatomic structures is substantially improved in the processed images.

Figure 9I:
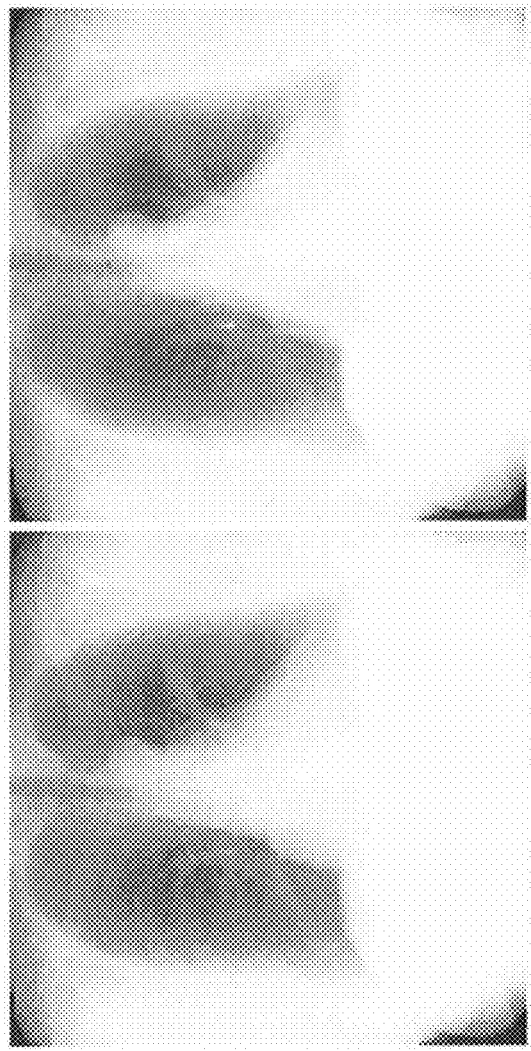
Figure 9J:
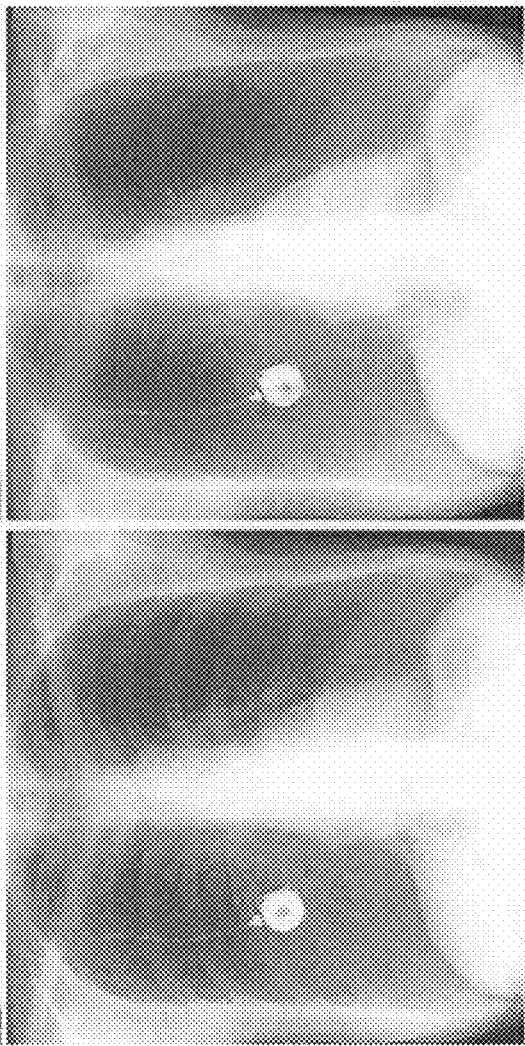
Figure 9C:
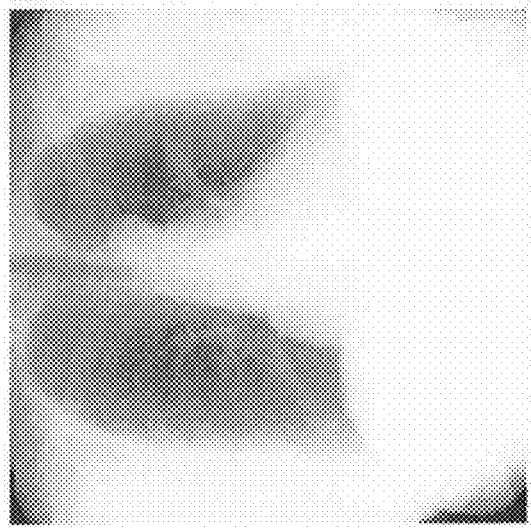
Figure 9D:
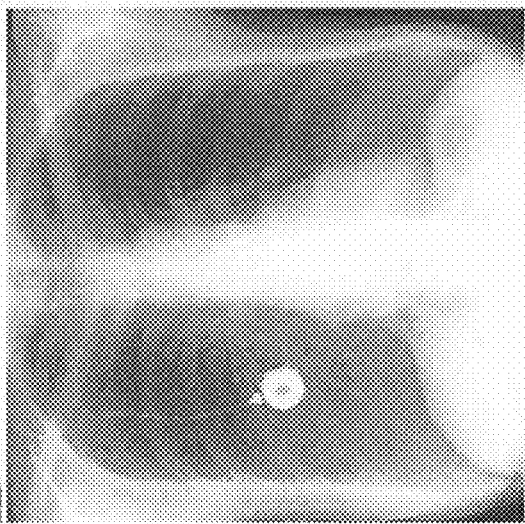

The trained multi-resolution MTANN was applied to non-training chest radiographs with interstitial diseases, which were acquired with a conventional radiography system. FIGS. 10A and 10B show the original chest radiographs. FIGS. 9C and 9D show the chest radiographs with rib suppression. The ribs and clavicles in chest radiographs are suppressed substantially, while the visibility of interstitial opacities is maintained. The processed images would be useful for quantitative assessment/analysis of interstitial diseases.

The distinction between nodules overlapping with ribs or clavicles and the false positives caused by ribs or clavicles in rib-suppressed chest radiographs is more effective than that in conventional chest radiographs. Rib-suppressed chest radiographs 1101 can be used for CAD methods for chest radiographs 1102, as shown in FIG. 11. The CAD methods may include a CAD method for lung nodule detection, a CAD method for lung nodule classification such as distinction between malignant and benign nodules, a CAD method for characterization of diseases, and a CAD method for quantitative analysis of interstitial diseases. A rib image 1103 is used for weighted subtraction from the chest radiograph, producing the rib-suppressed image 1101.

A major difficulty of computerized methods for chest radiographs is the distinction of ribs and clavicles from abnormalities or other anatomic structures. Therefore, rib-suppressed chest radiographs would be useful for computerized methods for chest radiographs including heart segmentation, and quantitative measurement of the heart.

False Positive Reduction in Lung Nodule Detection

In addition, to suppressing bone structures, an MTANN can also be trained to enhance the appearance of nodules in chest radiographs. Thus, the present invention provides a novel method for false positive reduction in a CAD method for lung nodule detection in chest radiographs by use of a Multi-MTANN together with rib-suppressed chest radiographs. In particular, an image in which the appearance of an anatomical structure (e.g., the rib cage) is suppressed, which is generated according to the method described above, may be used as the starting image in a method of detecting a medical abnormality (e.g., lung nodule), as will now be described.

Figure 12:
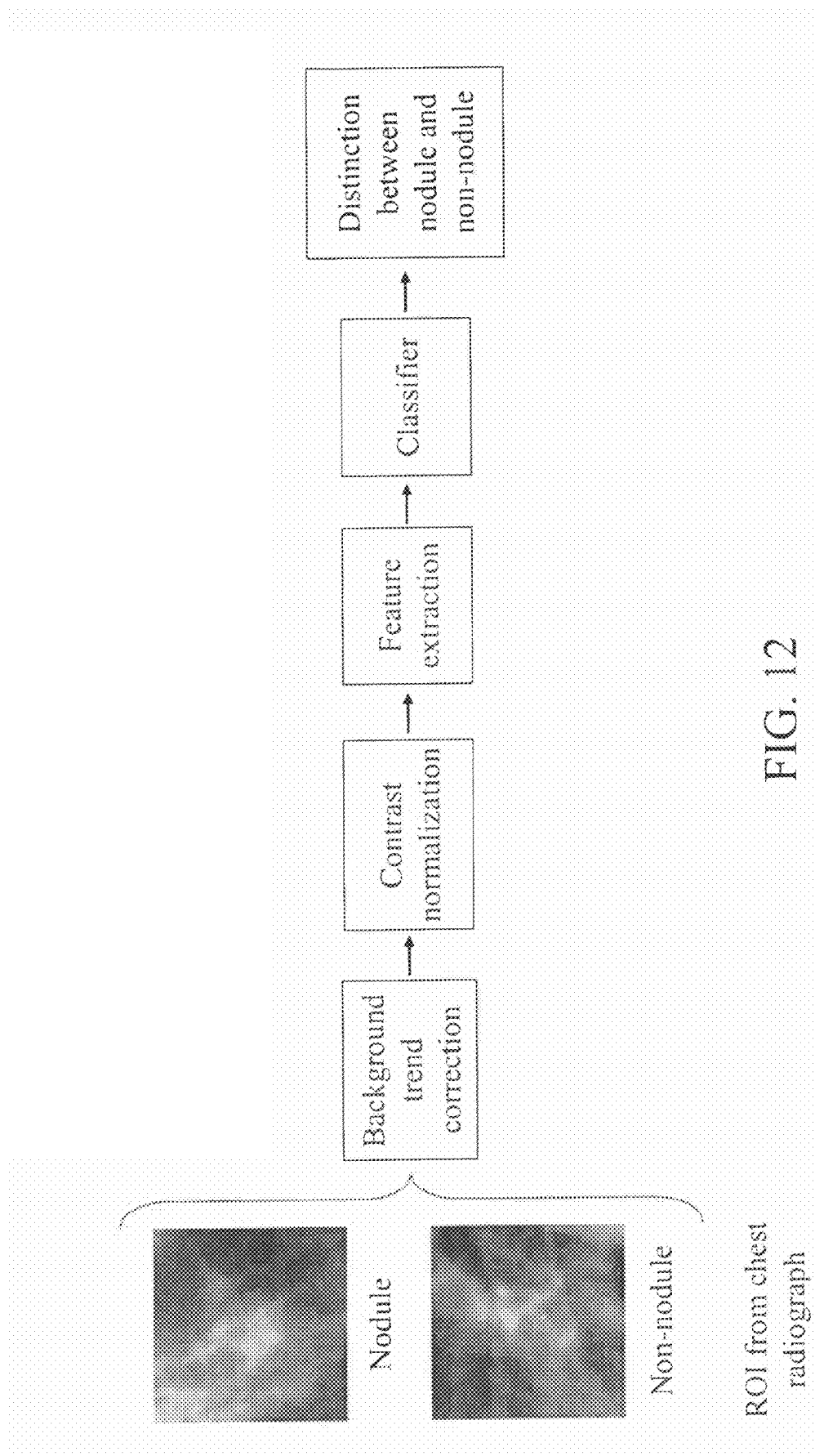
FIG. 12 illustrates a computer scheme in which an ROI is extracted from a chest radiograph, a background-trend-correction method and contrast normalization are applied to the ROI, image features are extracted from the processed ROI, and a distinction between nodules and non-nodules is performed by use of a classifier such as linear discriminant analysis or an artificial neural network.
Figure 13:
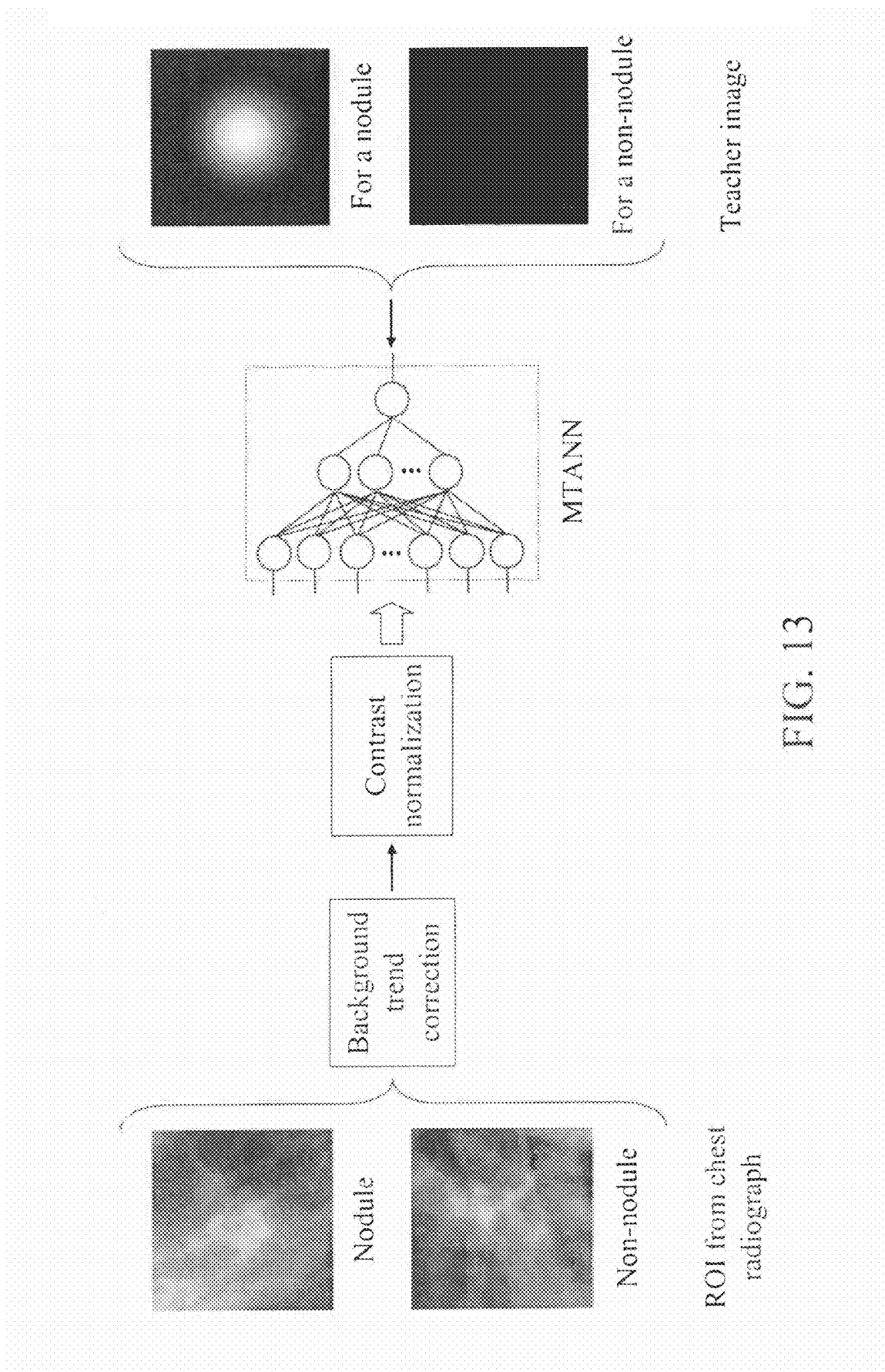
FIG. 13 illustrates training of the MTANN for distinction between nodules and non-nodules in chest radiographs, in which an ROI including a nodule or a non-nodule is extracted from a chest radiograph, and a background-trend-correction technique followed by contrast normalization is applied to the ROI.

The method for distinguishing between nodules and non-nodules in chest radiographs is shown in FIG. 12. The MTANN is very useful in performing the roles of feature extractor and classifier within the method. The training system of the MTANN for distinction between nodules and non-nodules in chest radiographs is shown in FIG. 13. The region of interest (ROI) including a nodule or a non-nodule is extracted from chest radiographs, which may have been subjected to rib-suppression pre-processing. The background trend in the ROI in a chest radiograph is, in general, different from those at different locations in the same image, those in a different patient's image, and those in an image acquired at a different acquisition condition. In order to reduce these effects, a background-trend-correction technique [56] was applied to the ROI. The background-trend-correction technique is a technique for reducing the background trend by subtracting a two-dimensional (2D) surface that is fitted to gray levels in the ROI from the original ROI.

A 2D nth order polynomial was used as the 2D surface, as follows:

$$F^n(x, y) = \sum_{k=1}^{n+1} \sum_{m=1}^{k} a_{(k-1)k/2+m} x^{k-m} y^{m-1}, \quad (10)$$

where $a_i$ is the ith coefficient, k is a variable, and m is a variable. The coefficients of the 2D polynomial are determined by use of the least-square method. The background-trend in the ROI is corrected by the following equation:

$$g_B(x,y) = g(x,y) - F^n(x,y). \quad (11)$$

Then, the contrast normalization is performed on the background-trend-corrected ROI. All pixel values in the ROI are divided by the average pixel value in a circle region $R_C$, represented by $$g_C(x, y) = \frac{g_B(x, y)}{\sum_{x,y \in R_C} g_B(x, y)/N}, \quad (12)$$

where N is the number of pixels in $R_C$. The diameter of the circle region was determined to be 40 pixels, which corresponds to the average size of nodules.

Figure 14:
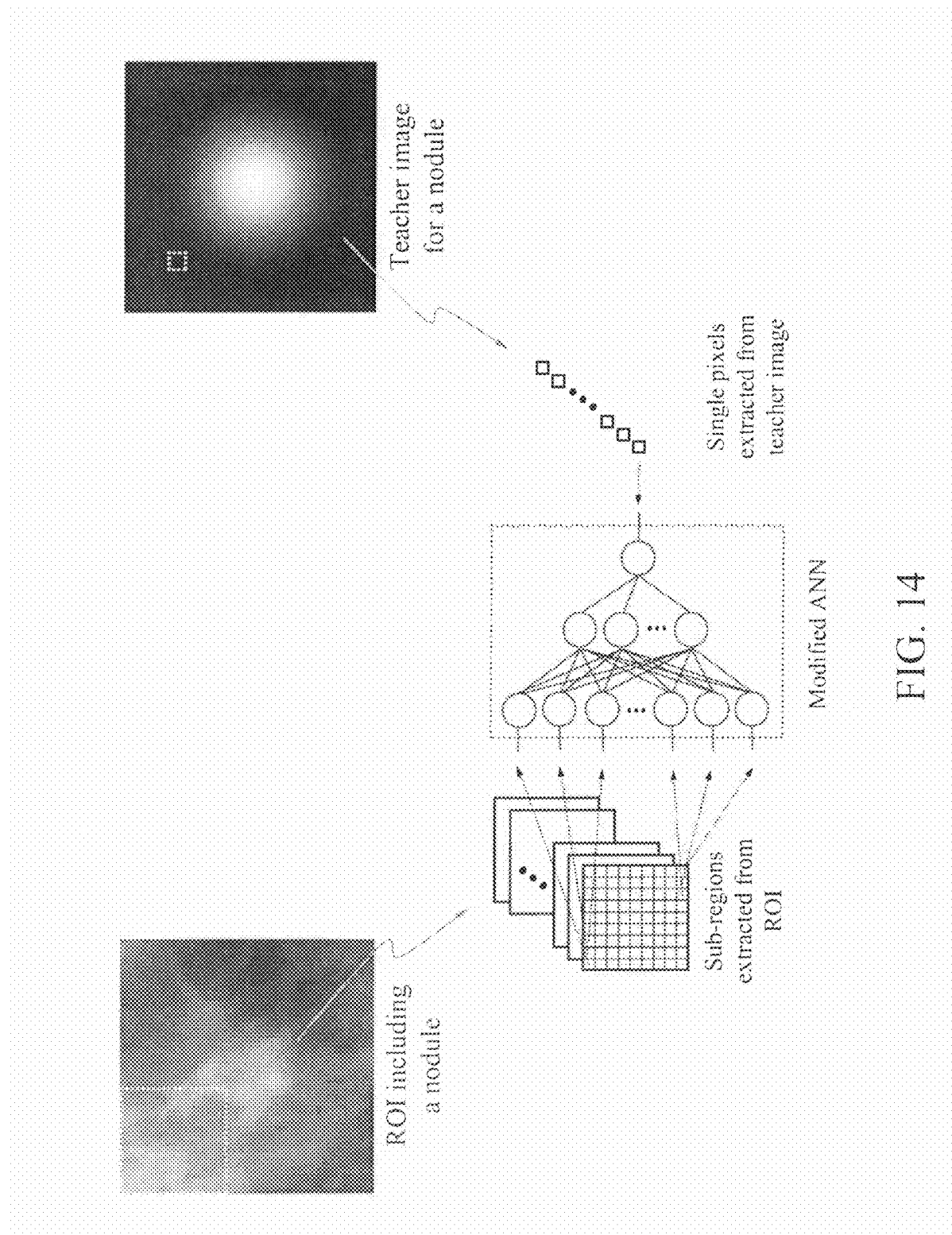
FIG. 14 illustrates a structure and training of the MTANN in which the pixel values in the sub-regions extracted from the ROI are entered as inputs to the MTANN, and the single teacher pixel corresponding to the input sub-region is used as a teacher value.

A more detailed structure of the MTANN of the present invention is illustrated in FIG. 14. The pixel values $g_C(x,y)$ of the ROI are normalized such that a pixel value of −200 is zero and a pixel value of 200 is one, which correspond to the mean for the minimum pixel values in the ROIs and the mean for the maximum pixel values in the ROIs, respectively. The inputs of the MTANN are the pixel values in a local window $R_S$ in the ROI. The output of the MTANN is a continuous value, which corresponds to the center pixel in the local window, represented by $$f(x,y) = NN\{I(x,y)\} = NN\{g_N(x-i, y-j) | i, j \in R_S\}, \quad (13)$$

where f(x,y) is the estimate for the teacher value, x and y are the indices of coordinates, NN{•} is the output of the modified multilayer ANN, I(x,y) is the input vector to the modified multilayer ANN, the elements of which are the normalized pixel values in the local window $R_S$, and $g_N(x,y)$ is the normalized pixel value. Note that only one unit is employed in the output layer. The output image is obtained by scanning of an input image with the MTANN.

For distinguishing between nodules and non-nodules, the teacher image is designed to contain the distribution for the "likelihood of being a nodule," i.e., the teacher image for nodules should contain a certain distribution, the peak of which is located at the center of the nodule, and that for non-nodules should contain zeros. A two-dimensional Gaussian function with standard deviation $\sigma_T$ at the center of the nodule was used as the distribution for the likelihood of being a nodule. FIG. 14 illustrates the training for an input image that contains a nodule or a non-nodule near the center. The training region $R_T$ in the input image is divided pixel-by-pixel into a large number of overlapping sub-regions. The size of the sub-region corresponds to that of the local window $R_S$ of the MTANN. The MTANN is trained by presenting each of the input sub-regions together with each of the corresponding teacher single pixels. As discussed above, the error to be minimized by training is defined by $$E = \frac{1}{2P} \sum_p \{T^{(p)} - f^{(p)}\}^2, \quad (14)$$

where p is a training pixel number, T(p) is the pth training pixel in the training regions $R_T$ in the teacher images, f(p) is the pth training pixel in the training region $R_T$ in the output images, and P is the number of training pixels. The MTANN is trained by a modified back-propagation (BP) algorithm [44,42], which was derived for the structure described above, i.e., a linear function is employed as the activation function of the unit in the output layer, in the same way as the original BP algorithm [46,47]. After training, the MTANN is expected to output the highest value when a nodule is located at the center of the local window of the MTANN, a lower value as the distance from the center increases, and zero when the input region is a non-nodule.

Figure 15:
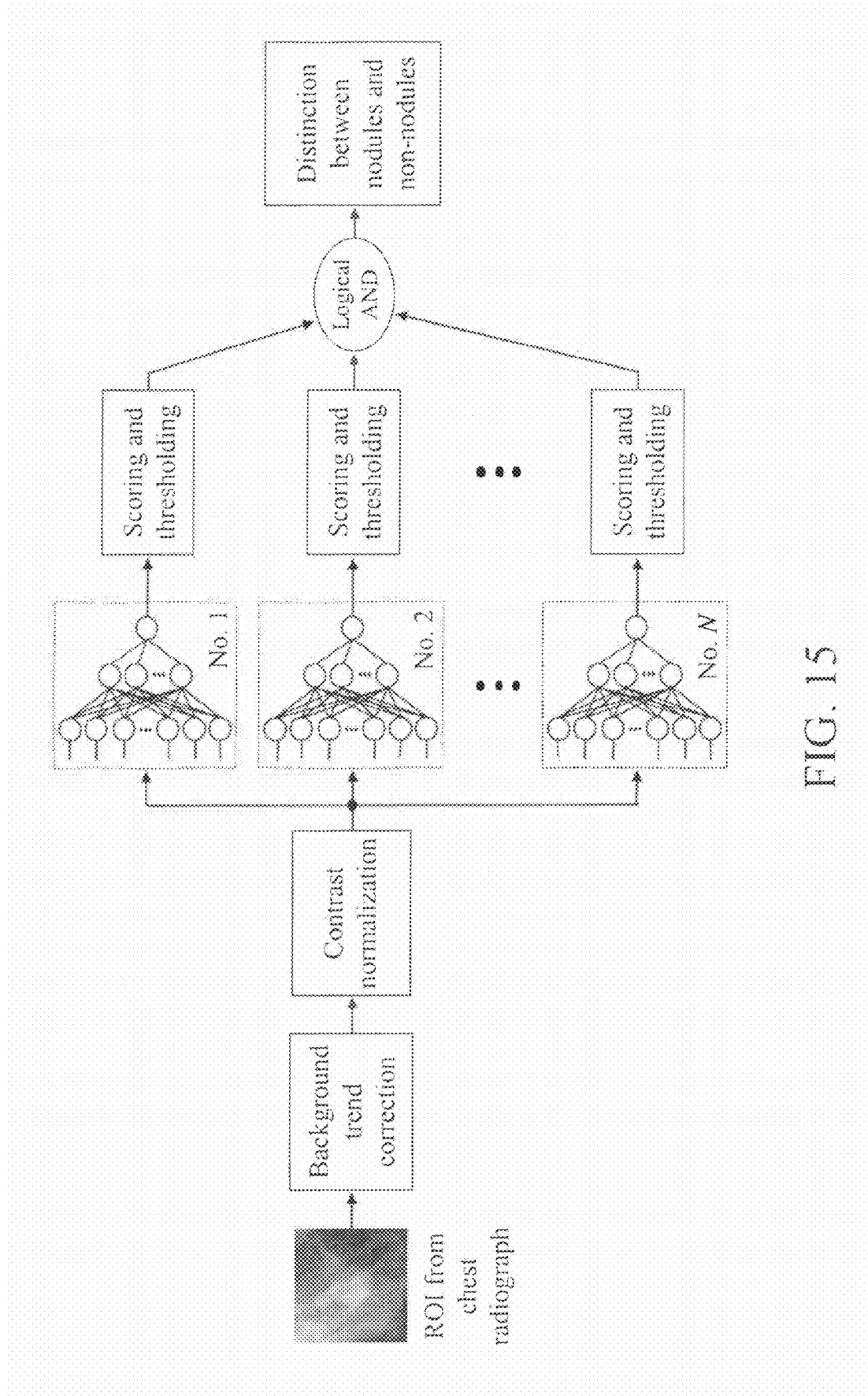
FIG. 15 illustrates an architecture of the Multi-MTANN having plural MTANNs arranged in parallel, each of which is expertly trained to distinguish between nodules and a specific type of non-nodule.

In order to distinguish between nodules and various types of non-nodules, the present invention has extended the capability of the single MTANN and provides a multiple MTANN (Multi-MTANN) [42]. The architecture of the Multi-MTANN is shown in FIG. 15. The Multi-MTANN consists of plural MTANNs that are arranged in parallel. Each MTANN is trained by using a different type of non-nodule, but with the same nodules. Each MTANN acts as an expert for distinction between nodules and non-nodules representing a specific type of non-nodule. Eight (8) MTANNs were used for the Multi-MTANN, because the false positives could be classified into eight major groups. A scoring method is applied to the output of each MTANN, and then thresholding of the score from each MTANN is performed for distinction between nodules and the specific type of non-nodule. The output of each MTANN is then integrated by the logical AND operation. If each MTANN can eliminate the specific type of non-nodule with which the MTANN is trained, then the Multi-MTANN can reduce a larger number of false positives than a single MTANN.

In the Multi-MTANN, each MTANN is trained independently by use of the same nodules and a different set of non-nodules. Training samples for each MTANN are selected by use of a selection method for training samples [43]. This selection method is a method for selecting training samples based on a free-response receiver operating characteristic (FROC) curve [57]. First, 12 typical nodules and 12 false positives (non-nodules) reported by the present CAD method as training cases for an MTANN were selected. The MTANN was trained with these training samples. The FROC curve for the trained MTANN was calculated. The training samples of 12 nodules and 12 non-nodules for another MTANN were selected around a different operating point in the FROC curve. Thus, the training samples of each MTANN were selected to be different types of non-nodules such as relatively thick ribs, relatively thin ribs, rib crossings, right ribs, left ribs, and lung vessels overlapping with ribs. By using these training samples, the individual MTANNs are expected to act as experts for the specific type of non-nodule after training.

When an original image for the sth nodule candidate is entered into the nth trained MTANN, the output image for the sth nodule candidate is obtained by scanning of the original image with the trained MTANN. The distinction between a nodule and a non-nodule is determined by use of a score defined from the output image of the nth trained MTANN, as described below:

$$S_{ns} = \sum_{x,y \in R_E} f_G(\sigma_n; x, y) \times f_{ns}(x, y), \quad (15)$$

where $S_{ns}$ is the score of the nth trained MTANN for the sth nodule candidate, $R_E$ is the region for evaluation, $f_{ns}(x,y)$ is the output image of the nth trained MTANN for the sth nodule candidate where its center corresponds to the center of $R_E$, $f_G(\sigma_n;x,y)$ is a two-dimensional Gaussian function with standard deviation $\sigma_n$ where its center corresponds to the center of $R_E$, and n is the MTANN number in the Multi-MTANN. This score represents the weighted sum of the estimate for the likelihood of the image containing a nodule near the center, i.e., a higher score would indicate a nodule, and a lower score would indicate a non-nodule. The distinction between nodules and the specific type of non-nodule is determined by thresholding the score with a different threshold for each trained MTANN, because the appropriate threshold for each trained MTANN may be different according to the type of non-nodule trained. The outputs of the expert MTANNs are combined by use of the logical AND operation such that each of the trained MTANNs eliminates none of the nodules, but removes some of the specific type of non-nodule for which the MTANN was trained.

In a study of the method to reduce false positives, an image database consisted of 91 conventional chest radiographs with 91 solitary pulmonary nodules from the Digital Image Database developed by the Japanese Society of Radiological Technology [31]. The chest radiographs were collected from 14 medical institutions. The absence and presence of nodules in the chest radiographs were confirmed by use of CT examinations. The locations of all nodules were confirmed by three chest radiologists. The chest radiographs were digitized with a 0.175-mm-pixel size, a matrix size of 2,048×2,048, and 12-bit gray-scale levels. The sizes of nodules ranged from 12.7 to 41.6 mm, and the average size was 24.9 mm. The database contained 64 malignant nodules and 27 benign nodules, which were confirmed by histologic and cytologic examinations or follow-up examinations. For efficiency, the size of all conventional chest radiographs was reduced to 512×512 pixels with 10-bit gray-scale levels in this study.

The CAD method for lung nodule detection in chest radiographs according to the present invention includes four steps: (1) preprocessing based on a difference-image technique [14-16], (2) identification of initial nodule candidates, (3) grouping initial nodule candidates, and (4) rule-based and linear discriminant classifiers for reduction of false positives [18]. The difference-image technique is a technique for enhancing lung nodules and suppressing background normal structures. The difference image was obtained by subtracting the nodule-suppressed image from the nodule-enhanced image. Initial nodule candidates were identified on the difference image by use of a multiple gray-level thresholding technique. The initial nodule candidates were grouped into 13 groups according to their pick-up threshold levels. Eight image features for each group were calculated, i.e., the effective diameter [14], degree of circularity [14], degree of irregularity [14], growth rate of the effective diameter [16], growth rate of the degree of circularity [16], growth rate of the degree of irregularity [16], run length [16], and contrast [14] in the original image and the difference image. The eight image features were used as input to the rule-based and linear discriminant classifiers. With the current CAD scheme, a sensitivity of 82.4% (75/91) with 4.5 (410/91) false positives per image was achieved for the database consisting of 91 chest radiographs. Seventy-five (75) true positives (nodules) and the 410 false positives (non-nodules) were used for testing the scheme for false positive reduction.

Figure 16A:
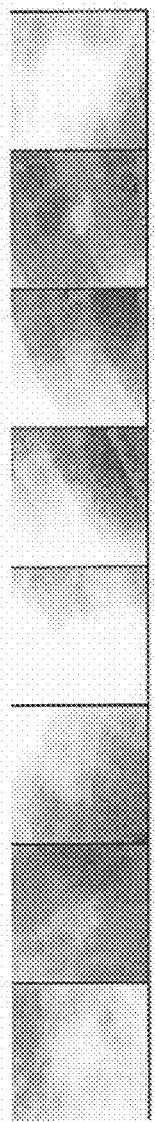
Figure 16B:
Figure 16C:
Figure 16D:
Figure 16E:
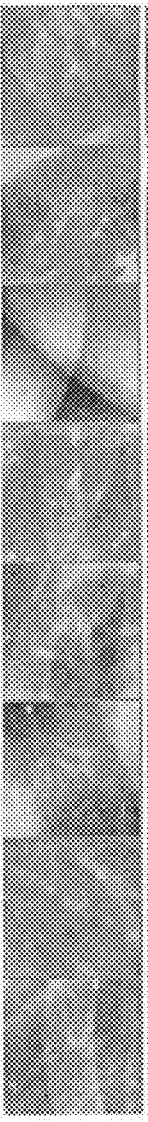
Figure 16F:

FIGS. 16A-16F illustrate the effect of the background-trend-correction and the contrast normalization. Since the variations of the backgrounds and the contrast of the original ROIs in FIGS. 16A and 16D are large, it is difficult to distinguish nodules from non-nodules in the original ROIs by use of computer analysis such as linear discriminant analysis or artificial neural networks. By performing the background-trend-correction and the contrast normalization, the variations of the backgrounds and the contrast are substantially reduced, as shown in FIGS. 16B, 16C, 16E, and 16F. The contrast of the nodules and their backgrounds are relatively constant in the processed ROIs. It is apparent that distinction between nodules and non-nodules in the processed ROIs is superior to that in the original ROIs.

Training samples used for an MTANN in the Multi-MTANN are illustrated in FIGS. 17A and 18A, where four of twelve training samples for nodules or non-nodules are displayed as examples. These ROIs (50×50 pixels of each ROI are displayed as an example) were extracted from conventional chest radiographs. FIGS. 17B and 18B illustrate the corresponding ROIs in the rib-suppressed chest radiographs obtained by use of the multi-resolution MTANN for rib suppression. FIGS. 17C and 18C together with 17D and 18D illustrate the background-trend-corrected ROIs and the contrast-normalized and trend-corrected ROIs, respectively, which were used as the input images to the MTANNs.

A three-layer structure was employed as the structure of the MTANN, because any continuous mapping can be approximately realized by three-layer ANNs [53,54]. The size of the local window $R_S$ of the MTANN, the standard deviation $\sigma_T$ of the two-dimensional Gaussian function, and the size of the training region $R_T$ in the teacher image were determined empirically to be 9×9 pixels, 5.0 pixels, and 19×19 pixels, respectively.

The number of hidden units of the MTANN by use of a method for designing the structure of an ANN [51,52]. The method is a sensitivity-based pruning method, i.e., the sensitivity to the training error was calculated when a certain unit was removed virtually, and the unit with the minimum training error was removed. Removing the redundant hidden units and retraining for recovering the potential loss due to the removal were performed alternately, resulting in a reduced structure where redundant units were removed. As a result, the number of hidden units was determined to be 25 units. Thus, the numbers of units in the input, hidden, and output layers were 81, 25, and 1, respectively. With the parameters above, the training of each MTANN in the Multi-MTANN was performed 500,000 times. The training took a CPU time of 29.8 hours on a PC-based workstation (CPU: Pentium IV, 1.7 GHz), and the time for applying the trained MTANN to nodule candidates was negligibly small.

FIGS. 17E and 18E illustrate the output images of the trained MTANN. The nodules in the output images are represented by light distribution near the centers of ROIs, while the non-nodules in the output images are mostly dark around the center. FIGS. 19A, 19B, 20A, and 20B show the output images of the trained MTANN for non-training cases. The distinction between nodules and non-nodules are superior to that in the original images. The trained Multi-MTANN were applied to the 75 true positives (nodules) and the 410 false positives (non-nodules) produced by the CAD method. Note that training cases of 12 nodules and 96 non-nodules were included in this evaluation.

Figure 21:
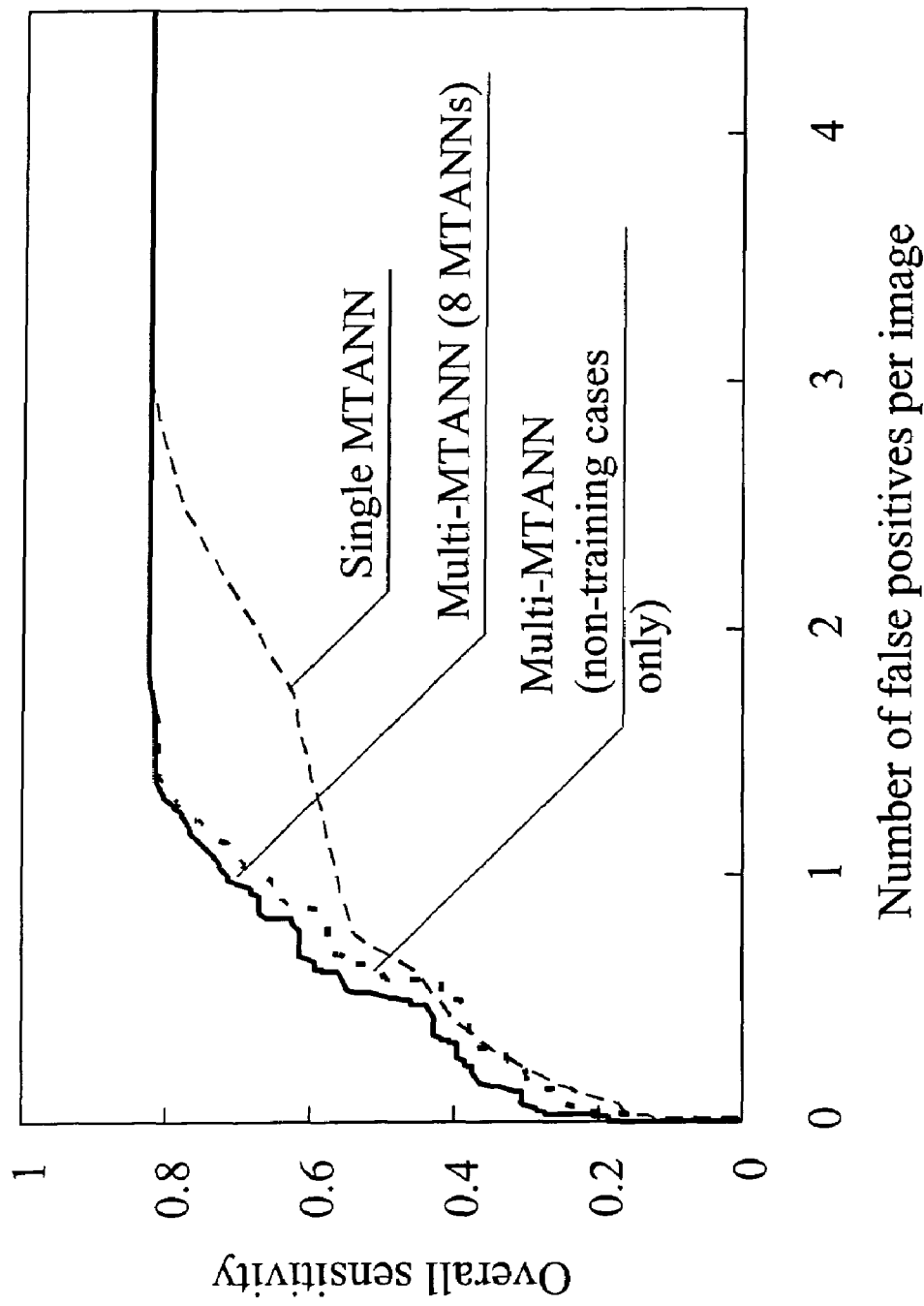
FIG. 21 illustrates FROC curves of the single MTANN, the Multi-MTANN consisting of eight MTANNs and the Multi-MTANN for non-training cases.

The performance of the single MTANN and the Multi-MTANN was evaluated by FROC curves, as shown in FIG. 21. The FROC curve expresses a classification sensitivity as a function of the number of false positives per image at a specific operating point. The performance of the Multi-MTANN for non-training cases, i.e., the training cases were excluded from the evaluation, was similar to that of the Multi-MTANN for complete database. This indicates the Multi-MTANN has high generalization ability (performance for non-training cases). The number of false positives per image is defined by $$FPS = \frac{RFP}{NIMG \times \frac{TFP - FPT}{TFP}} \quad (16)$$

where RFP is the number of remaining false positives after application of a false-positive reduction method, NIMG is the number of images in the complete database, TFP is the total number of false positives reported by the CAD scheme, and FPT is the number of false positives used as training samples, so that the fact that some false positives were used to train the Multi-MTANN does not artificially lower the overall false-positive rate. With the Multi-MTANN, the number of false positives was reduced to about 30% (125/410) with a reduction of one true positive. The false-positive rate of the present CAD method was improved from 4.5 to 1.4 (125/91) false positives per image at the overall sensitivity of 81.3% (74/91).

Figure 23:
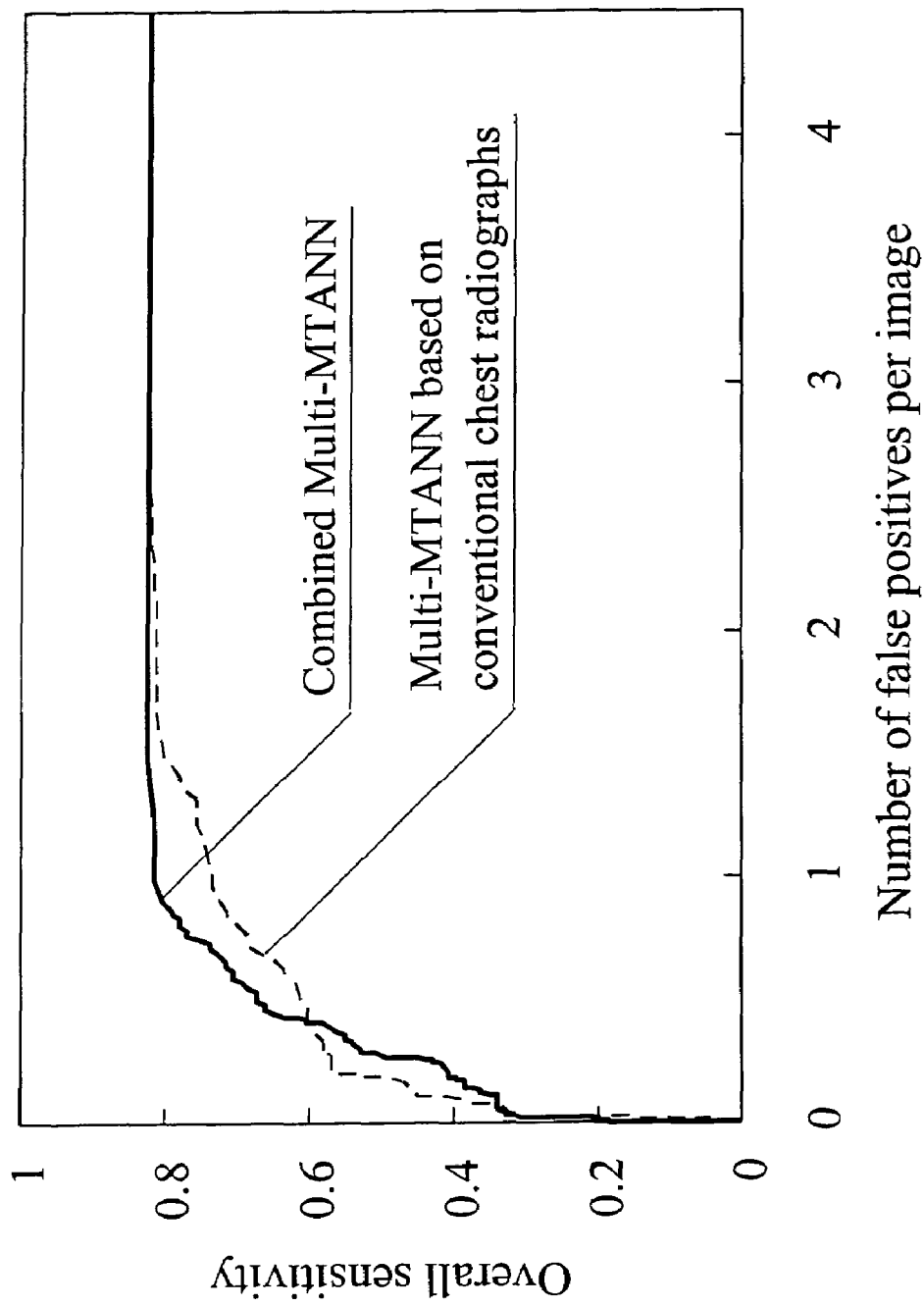
FIG. 23 illustrates FROC curves of the Multi-MTANN using conventional chest radiographs and the combined Multi-MTANN.
Figure 24:
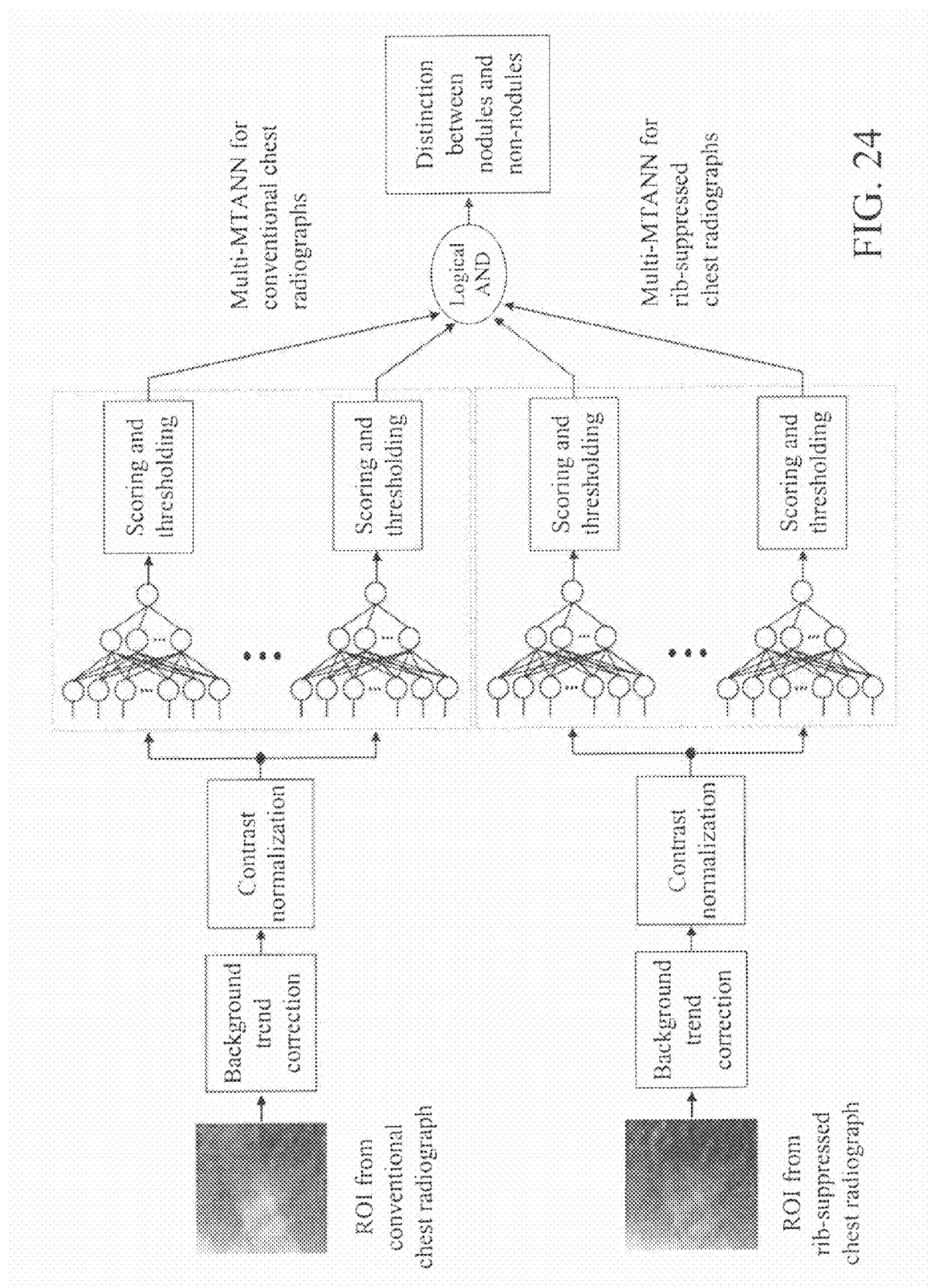
FIG. 24 illustrates an architecture of the combined Multi-MTANN consisting of the Multi-MTANN for conventional chest radiographs and the Multi-MTANN for rib-suppressed chest radiographs.

The types of false positives reduced by the Multi-MTANN based on conventional chest radiographs would be different from those reduced by the Multi-MTANN based on rib-suppressed chest radiographs. The Multi-MTANN was trained using conventional chest radiographs. FIG. 23 shows the performance of the trained Multi-MTANN. The result indicated that 63% (257/410) of false positives were removed with a reduction of one true positive. The remaining false positives were different from those produced by the Multi-MTANN based on rib-suppressed chest radiographs. These Multi-MTANNs were combined to further the reduction of false positives. FIG. 24 shows the architecture of the combined Multi-MTANN including the Multi-MTANN for conventional chest radiographs and the Multi-MTANN for rib-suppressed chest radiographs. The output of each MTANN in both Multi-MTANNs is integrated by the logical AND operation. FIG. 23 shows the performance of the combined Multi-MTANN. By using the combined Multi-MTANN, 78% (320/410) of false positives were removed with a reduction of one true positive. The false-positive rate of the present CAD method was improved from 4.5 to 1.0 (90/91) false positives per image at the overall sensitivity of 81.3% (74/91).

Figure 25:
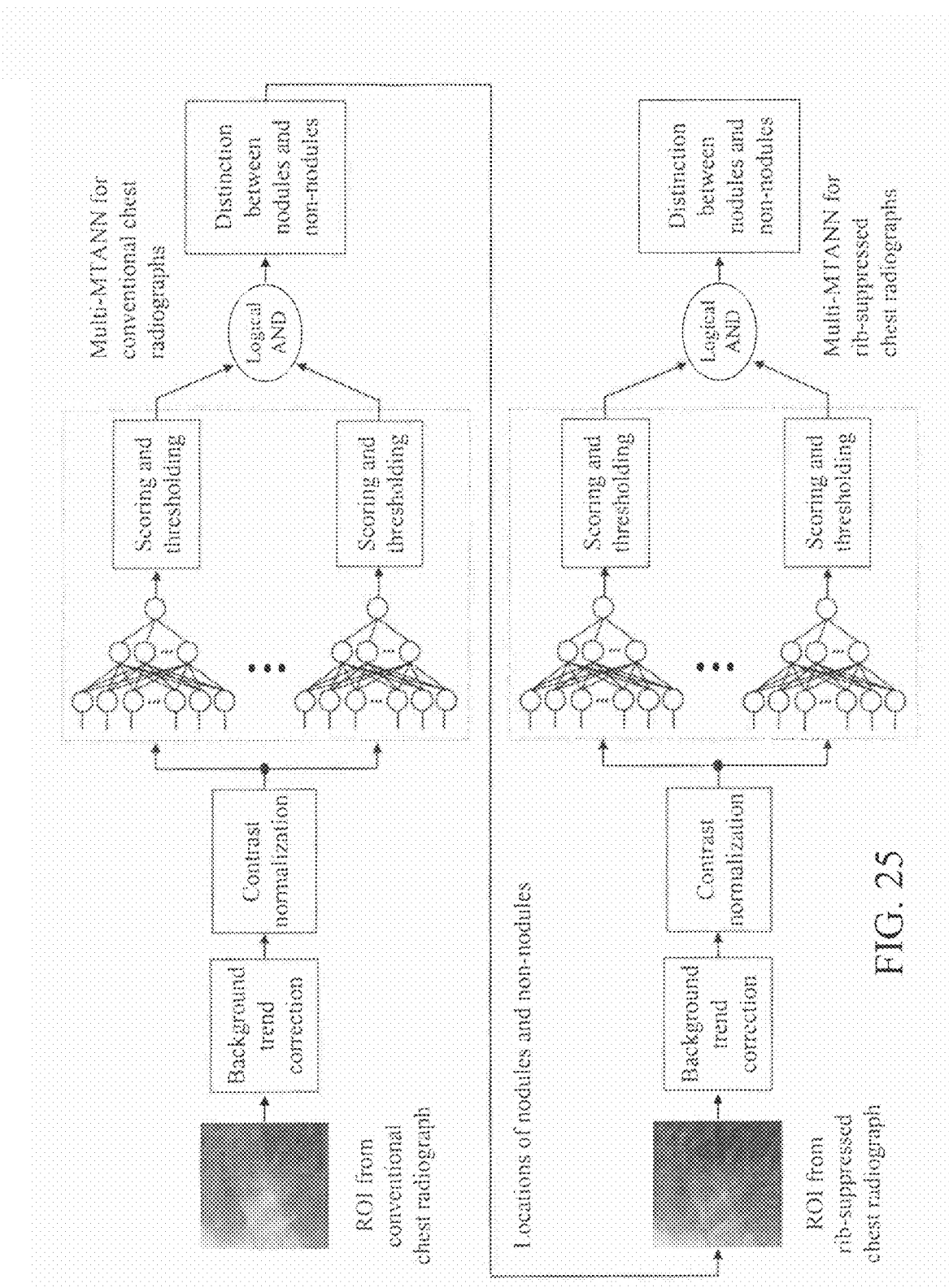
FIG. 25 illustrates the sequential architecture of the Multi-MTANN based on conventional chest radiographs, followed by the Multi-MTANN based on rib-suppressed chest radiographs.

FIG. 25 illustrates the sequential architecture of the Multi-MTANN based on conventional chest radiographs followed by the Multi-MTANN based on rib-suppressed chest radiographs. The training samples for the Multi-MTANN based on rib-suppressed chest radiographs were selected from the corresponding locations of the remaining nodules and false positives produced by the Multi-MTANN based on conventional chest radiographs. The variations in the remaining false positives would be relatively small. Therefore, the Multi-MTANN based on rib-suppressed chest radiographs can reduce the number of false positives.

Figure 26:
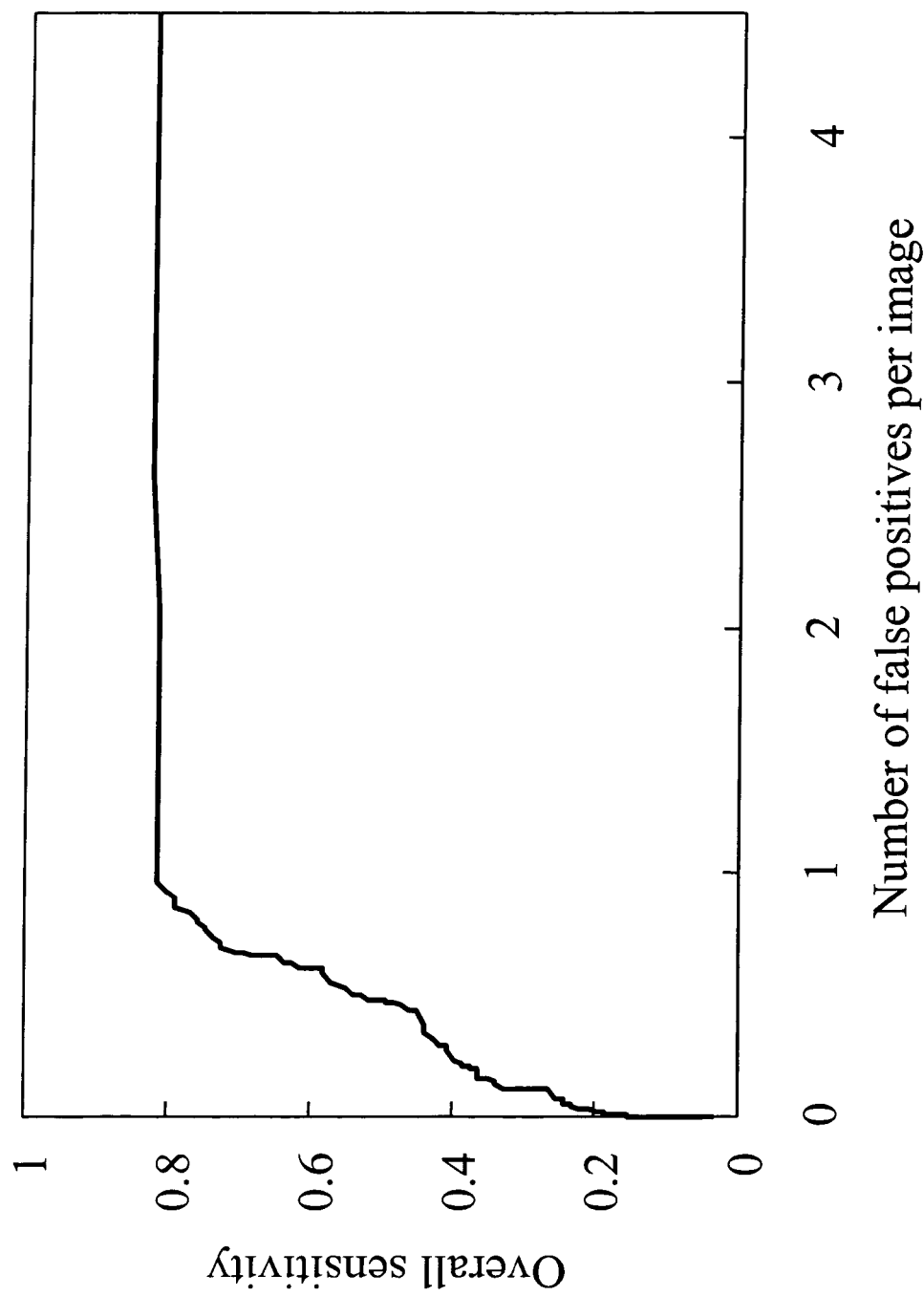
FIG. 26 illustrates FROC curves of the sequentially combined Multi-MTANN.

FIG. 26 shows the performance of the sequentially combined Multi-MTANN. First, the Multi-MTANN based on conventional chest radiographs removed 63% (257/410) of false positives with a reduction of one true positive. Next, the Multi-MTANN based on rib-suppressed chest radiographs was applied for further removal of the remaining false positives, and removed 16% (65/410) of false positives with a reduction of one true positive. Finally, by use of the sequentially combined Multi-MTANN, 79% (322/410) of false positives were removed with a reduction of two true positives. The false-positive rate of the CAD scheme was improved from 4.5 to 0.92 (84/91) false positives per image at the overall sensitivity of 80.2% (73/91).

Figure 22:
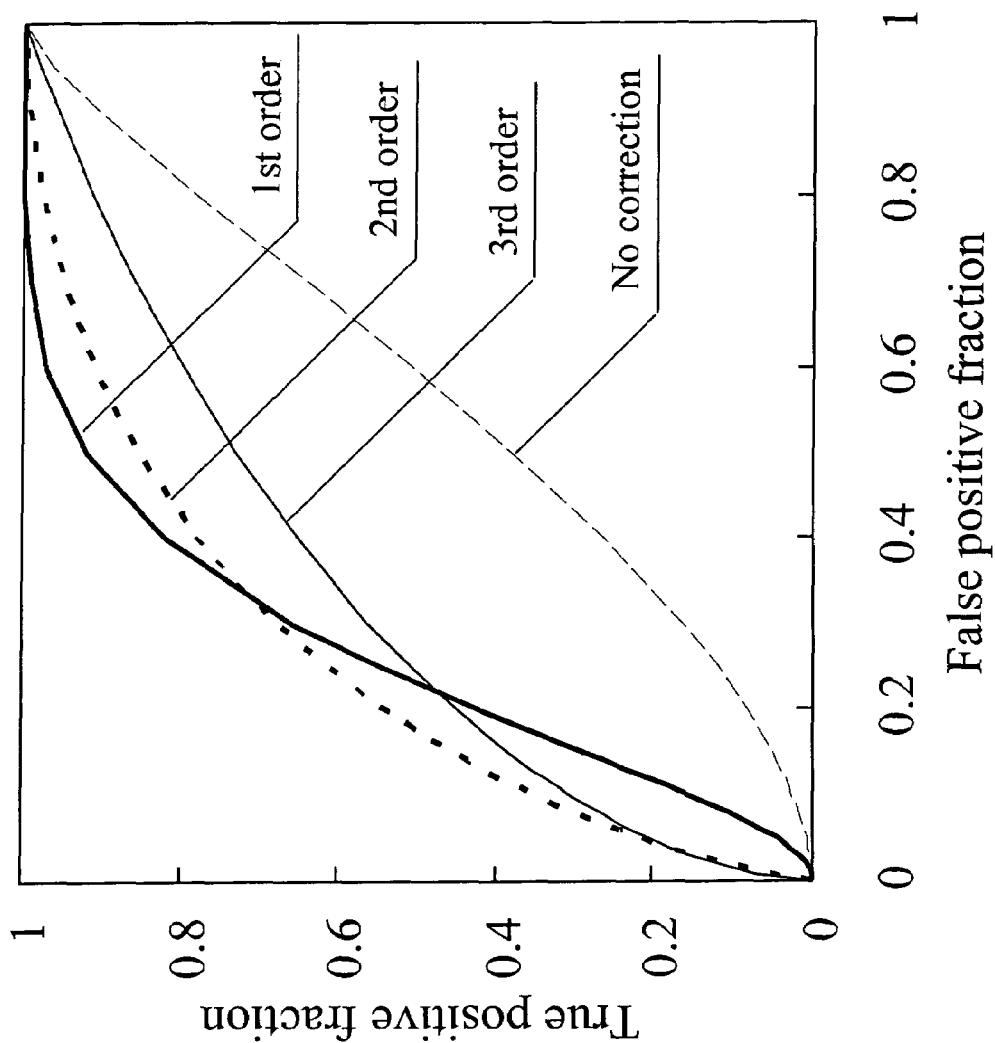
FIG. 22 illustrates the effect of no background trend correction, use of the first order polynomial in background trend correction, use of the second order polynomial, and use of the third order polynomial on the performance of the MTANN.

To investigate the effect of the background trend correction on the performance, the experiment was carried out with four conditions, i.e., no background trend correction, use of the first order polynomial in background trend correction, use of the second order polynomial, and use of the third order polynomial. The performance of the MTANN was evaluated by (receiver operating characteristic) ROC analysis [58,59]. FIG. 22 shows the ROC curves for the MTANNs with the four conditions. The Az value (the area under the ROC curves) [60] for the MTANN using the background trend correction with the first order polynomial and that for the MTANN with the second order polynomial were similar (Az=0.75). However, the performance of the MTANN with the first order polynomial at higher sensitivities was better than that with the second order polynomial. Therefore, the first order polynomial was used in the background trend correction.

For the purposes of this description we shall define an image to be a representation of a physical scene, in which the image has been generated by some imaging technology: examples of imaging technology could include television or CCD cameras or X-ray, sonar or ultrasound imaging devices. The initial medium on which an image is recorded could be an electronic solid-state device, a photographic film, or some other device such as a photostimulable phosphor. That recorded image could then be converted into digital form by a combination of electronic (as in the case of a CCD signal) or mechanical/optical means (as in the case of digitizing a photographic film or digitizing the data from a photostimulable phosphor). The number of dimensions which an image could have could be one (e.g. acoustic signals), two (e.g. X-ray radiological images) or more (e.g. nuclear magnetic resonance images).

The inventive system conveniently may be implemented using a conventional general purpose computer or microprocessor programmed according to the teachings of the present invention, as will be apparent to those skilled in the computer art. Appropriate software can readily be prepared by programmers of ordinary skill based on the teachings of the present disclosure, as will be apparent to those skilled in the software art.

A general purpose computer may implement the method of the present invention, wherein the computer housing houses a motherboard which contains a CPU (central processing unit), memory such as DRAM (dynamic random access memory), ROM (read only memory), EPROM (erasable programmable read only memory), EEPROM (electrically erasable programmable read only memory), SRAM (static random access memory), SDRAM (synchronous dynamic random access memory), and Flash RAM (random access memory), and other optical special purpose logic devices such as ASICs (application specific integrated circuits) or configurable logic devices such GAL (generic array logic) and reprogrammable FPGAs (field programmable gate arrays).

The computer may also include plural input devices, (e.g., keyboard and mouse), and a display card for controlling a monitor. Additionally, the computer may include a floppy disk drive; other removable media devices (e.g. compact disc, tape, and removable magneto optical media); and a hard disk or other fixed high density media drives, connected using an appropriate device bus such as a SCSI (small computer system interface) bus, an Enhanced IDE (integrated drive electronics) bus, or an Ultra DMA (direct memory access) bus. The computer may also include a compact disc reader, a compact disc reader/writer unit, or a compact disc jukebox, which may be connected to the same device bus or to another device bus.

As stated above, the system includes at least one computer readable medium. Examples of computer readable media include compact discs, hard disks, floppy disks, tape, magneto optical disks, PROMs (e.g., EPROM, EEPROM, Flash EPROM), DRAM, SRAM, SDRAM, etc. Stored on any one or on a combination of computer readable media, the present invention includes software for controlling both the hardware of the computer and for enabling the computer to interact with a human user. Such software may include, but is not limited to, device drivers, operating systems and user applications, such as development tools.

Such computer readable media further includes the computer program product of the present invention for performing the inventive method herein disclosed. The computer code devices of the present invention can be any interpreted or executable code mechanism, including but not limited to, scripts, interpreters, dynamic link libraries, Java classes, and complete executable programs.

Moreover, parts of the processing of the present invention may be distributed for better performance, reliability, and/or cost. For example, an outline or image may be selected on a first computer and sent to a second computer for remote diagnosis.

The invention may also be implemented by the preparation of application specific integrated circuits (ASICs) or by interconnecting an appropriate network of conventional component circuits, as will be readily apparent to those skilled in the art.

The preferred embodiment of the present invention is embodied in trained artificial neural networks, in arrangements for training such artificial neural networks, and in systems including both the network portion and the training portions. Of course, the invention provides methods of training and methods of execution. Moreover, the invention provides computer program products storing program instructions for execution on a computer system, which when executed by the computer system, cause the computer system to perform the methods described herein.

Numerous modifications and variations of the present invention are possible in light of the above teachings. For example, the invention may be applied to images other than chest radiographs. Further, the particular architecture of the multi-training artificial neural network, the particular filtering of the output of the artificial neural network, the particular training images, may be varied without departing from the scope of the invention.

In addition, the method of the present invention may be applied as follows. An image may be obtained in which the appearance of a specific organ relative to other anatomic structures is enhanced by applying contrast media to the specific organ (e.g., by injection or ingestion). An image consisting primarily of only the specific organ can be obtained by subtracting the image without contrast media from the contrast-enhanced image. Then, this image, or a plurality of such images, can be used as a teacher image for an image processing device. The trained image processing device may then be used to modify the appearance of the specific organ in images obtained without contrast media.

The method of the present invention also may be applied to various other diagnostic tasks. For example, the appearance of bones and/or vessels in CT images can be altered by using MR training images. Typically, there is neither bone information nor vessel (blood flow) information in normal MR images. An image registration technique (e.g., [61][62]) may be applied to the CT images and the MR images to match the locations of the objects (anatomical structures and/or organs) in these images when the training of the present invention is performed. Another possibility is to obtain an image of a specific organ without other anatomical structures from an image of a specific organ enhanced by the contrast media with other structures. This process can be considered as a specific organ extraction and can be performed by use of the images after and before the injection of the contrast media. When a computer is trained, the contrast-enhanced specific organ image can be used as the input image. The image without other normal structures can be obtained by subtracting the image without contrast media from the contrast-enhanced specific organ image. Then, this image can be used as the teacher image. Thus, motion artifacts which tend to occur due to the motion of organs before and after the injection of the contrast media can be avoided. Finally, a CT image may be used to determine where the liver is in MR images using the method and system of the present invention.

In addition, the method of the present invention may be used to obtain improved angiographic images. It is known that images depicting only vessels may be obtained by subtracting an image obtained without injecting contrast media from an image obtained with contrast media. However, such images may include artifacts due to motion (for example, beating of the heart) that occurs between obtaining the two images. If a set of such images that do not contain motion artifacts are selected, they may be used as training images for an image processing device according to the present invention. Once an image processing device is trained with images that only depict blood vessels, it may be used to process an image of a patient that is obtained using contrast media. Specifically, the trained image processing device can remove unwanted parts of the image (for example, heart muscle, bone, ribs, spine, etc.) according to the methods described herein. Using such methods, an angiographic image of a patient depicting only vessels can be obtained with only one image acquisition step, rather than two. These methods could be applied to medical images where a specific organ is enhanced with contrast media (agent) such as x-ray angiography, CT angiography, MR angiography, ultrasonography, CT colonography, MR colonography, or contrast radiography.

Further, the present invention would be useful for radiologists' diagnosis on medical images by showing an image where the specific anatomical structure is modified, such as detection and classification of nodules in chest radiographs and CT, detection and classification of thrombus/pulmonary embolism in CT, detection and classification of microcalcification and mass on mammograms, detection and classification of aneurysms on vessels in CT and MRI, detection and classification of polyps in CT colonography, detection and classification of mass on ultrasound and MRI, detection and classification of stenosis on vessels in x-ray angiography, CTA, and MRA, detection and classification of diffuse lung diseases on chest radiography and CT, etc.

The present invention may be applied to virtually any field in which a target pattern must be distinguished from other patterns in image(s). The MTANN distinguishes target objects (or areas) from others by using pattern (feature) differences: artificial neural networks, trained as described above, can detect target objects (or areas) that humans might intuitively recognize at a glance. For example, the invention may be applied to these fields, in addition to the medical imaging application that is described above:

- Detection of other vehicles, white line lane markers, traffic signals, pedestrians, and other obstacles in road images,
- Detection of eyes, mouths, and noses in facial images,
- Detection of fingerprints in "dust" images,
- Detection of faulty wiring in semiconductor integrated circuit pattern images,
- Detection of mechanical parts in robotic eye images,
- Detection of guns, knives, box cutters, or other weapons or prohibited items in X-ray images of baggage,
- Detection of airplane shadows, submarine shadows, schools of fish, and other objects, in radar or sonar images,
- Detection of missiles, missile launchers, tanks, personnel carriers, or other potential military targets, in military images,
- Detection of weather pattern structures such as rain clouds, thunderstorms, incipient tornadoes or hurricanes, and the like, in satellite and radar images,
- Detection of areas of vegetation from satellite or high-altitude aircraft images,
- Detection of patterns in woven fabrics, for example, using texture analysis,
- Detection of seismic or geologic patterns, for use in oil or mineral prospecting,
- Detection of stars, nebulae, galaxies, and other cosmic structures in telescope images, etc.

The various applications of detection, exemplified in the list above, can be succeeded by a distinction of one specific target structure from another specific structure, once they have been detected. For example, after a fingerprint is detected in a "dust" image, the detected fingerprint can be compared to suspects' fingerprints to verify or disprove the identify of the person leaving the detected fingerprint.

Of course, the particular hardware or software implementation of the present invention may be varied while still remaining within the scope of the present invention. It is therefore to be understood that within the scope of the appended claims and their equivalents, the invention may be practiced otherwise than as specifically described herein.

The invention claimed is:

1. A method of modifying an appearance of an anatomical structure in a medical image, comprising:
    acquiring, using a first imaging modality, a first medical image that includes the anatomical structure;
    applying the first medical image to a trained image processing device to obtain a second medical image, corresponding to the first medical image, in which the appearance of the anatomical structure is modified; and
    outputting the second medical image,
    wherein the image processing device is trained using a teacher image obtained from a second imaging modality that is different from the first imaging modality.

2. The method of claim 1, further comprising:
    identifying an abnormality in the second medical image using a second image processing device.

3. The method of claim 2, wherein the identifying step comprises:
    selecting a region of interest (ROI) in the second medical image;
    background-trend correcting the ROI to obtain a corrected ROI; and
    applying the input ROI to a massive training artificial neural network (MTANN) to obtain an indication of whether the abnormality is present in the ROI, wherein the MTANN is trained to detect the abnormality.

4. The method of claim 3, further comprising:
    normalizing a contrast in the corrected ROI to obtain an input ROI.

5. The method of claim 3, wherein the MTANN comprises:
    plural networks trained to distinguish between the abnormality and respective anatomical structures.

6. The method of claim 2, further comprising:
    displaying a location of the abnormality on the first medical image.

7. The method of claim 1, wherein the acquiring step comprises:
    acquiring the first medical image using one of CT, MRI, ultrasound, and an X-ray projection imaging system.

8. The method of claim 1, wherein the teacher image is obtained from one of CT, MRI, ultrasound, and an X-ray projection imaging system.

9. The method of claim 8, wherein the teacher image is a contrast-media enhanced image.

10. The method of claim 1, further comprising:
    processing the first medical image to obtain plural processed images, wherein each of the plural processed images has a respective image resolution.

11. The method of claim 10, wherein the processing step comprises:
    downsampling and averaging the first medical image to obtain a medium resolution image;
    upsampling the medium resolution image to obtain an expanded medium resolution image;
    calculating a high resolution difference image by subtracting the expanded medium resolution image from the first medical image;
    downsampling and averaging the medium resolution image to obtain a low resolution image;
    upsampling the low resolution to obtain an expanded low resolution image; and
    calculating a medium resolution difference image by subtracting the expanded low resolution image from the medium resolution image,
    wherein the plural processed images include the high resolution difference image, the medium resolution difference image, and the low resolution image.

12. The method of claim 11, wherein the step of downsampling and averaging the first medical image comprises:
    dividing the first medical image into a plurality of two-pixel-by-two-pixel regions;

calculating the mean pixel value in one of the plurality of regions obtained in the dividing step;

setting a corresponding pixel value in the medium resolution image to the mean pixel value; and repeating the preceding calculating and setting steps for each of the plurality of regions of the first medical image to obtain the medium resolution image.

13. The method of claim 10, wherein the processing step comprises:

downsampling and averaging the first medical image to obtain a lower resolution image;

upsampling the lower resolution image to obtain an expanded lower resolution image;

calculating a difference image by subtracting the expanded lower resolution image from the first medical image; and repeating, for a predetermined number of times, the preceding downsampling, upsampling, and calculating steps on each successive lower resolution image to obtain plural difference images, wherein the plural processed images include (1) the plural difference images, and (2) the lower resolution image obtained by a final downsampling and averaging step.

14. The method of claim 10, wherein the applying step comprises:

applying the plural processed images to respective massive training artificial neural networks (MTANN) to obtain plural output images, wherein each MTANN is trained to detect the anatomical structure at one of the corresponding image resolutions.

15. The method of claim 14, wherein the applying step comprises:

dividing the first medical image into a plurality of overlapping sub-regions;

obtaining an output pixel value by simultaneously applying each pixel in one of the plural sub-regions to the MTANN that is trained to detect the anatomical structure at one of the corresponding image resolutions;

setting, to the output pixel value, a corresponding pixel in the output image associated with the MTANN that is trained to detect the anatomical structure at the one of the corresponding image resolutions; and repeating the preceding obtaining and setting steps for each sub-region of the plurality of sub-regions.

16. The method of claim 14, further comprising:

combining the plural output images to obtain an enhanced image in which the appearance of the anatomical structure is modified.

17. The method of claim 14, further comprising:

combining the plural output images to obtain an enhanced image in which the appearance of the anatomical structure is enhanced; and subtracting the enhanced image from the first medical image to obtain the second medical image, wherein the appearance of the anatomical structure is suppressed in the second medical image.

18. The method of claim 16, wherein the combining step comprises:

combining the plural output images to obtain the enhanced image, wherein the first medical image and the enhanced image have a same image resolution.

19. The method of claim 16, wherein the combining step comprises:

upsampling an output image of the plural output images having a lowest image resolution to obtain an expanded low resolution image;

calculating a medium resolution output image by adding (1) the expanded low resolution image, and (2) an output image of the plural output images having a medium image resolution, the medium image resolution being greater than the lowest image resolution and less than a highest image resolution;

upsampling the medium resolution output image to obtain an expanded medium resolution image; and calculating the second medical image by adding (1) the expanded medium resolution image, and (2) an output image of the plural output images having the highest image resolution.

20. The method of claim 16, wherein the combining step comprises:

upsampling an output image of the plural output images having a lowest image resolution to obtain an expanded low resolution image;

calculating a higher resolution output image by adding (1) the expanded low resolution image, and (2) an output image of the plural output images having a next highest image resolution;

repeating, for a predetermined number of times, the upsampling and calculating steps on each successive higher resolution output image; and setting the second medical image to be the higher resolution output image calculated on a final calculating step.

21. The method of claim 14, further comprising:

independently training each MTANN to detect the anatomical structure in a spatial frequency range equivalent to one of the corresponding image resolutions.

22. The method of claim 14, further comprising:

providing dual-energy subtraction images of the anatomical structure as the plural teacher images to train each MTANN.

23. The method of claim 21, wherein each MTANN is trained using a modified back-propagation algorithm.

24. The method of claim 1, further comprising:

identifying a specific region in the first medical image; and modifying the appearance of the anatomical structure in the specific region in the second medical image.

25. The method of claim 24, wherein the modifying step comprises:

changing gray levels in the specific region in the second medical image.

26. The method of claim 1, wherein the acquiring step comprises:

acquiring, as the first medical image, a chest radiograph that includes at least one of a rib and a clavicle.

27. A method of modifying an appearance of an anatomical structure in a medical image, comprising:

acquiring a first medical image that includes the anatomical structure; processing the first medical image to obtain plural processed images, wherein each of the plural processed images has a corresponding image resolution;

applying the plural processed images to respective image processing devices, wherein each image processing device is configured to modify the appearance of the anatomical structure at one of the corresponding image resolutions;

combining the plural output images to obtain a second medical image in which the appearance of the anatomical structure is modified in the second medical image; and outputting the second medical image.

28. The method of claim 27, wherein the acquiring step comprises acquiring a chest radiograph that includes a rib structure; and the method further comprises subtracting the second medical image from the first medical image to obtain a soft-tissue image in which the appearance of the rib structure is suppressed.

29. The method of claim 27, wherein the step of acquiring the first medical image comprises:

acquiring the first medical image using a first imaging modality.

* * * * *